US006963842B2

(12) United States Patent
Goodwin

(10) Patent No.: US 6,963,842 B2
(45) Date of Patent: Nov. 8, 2005

(54) EFFICIENT SYSTEM AND METHOD FOR CONVERTING BETWEEN DIFFERENT TRANSFORM-DOMAIN SIGNAL REPRESENTATIONS

(75) Inventor: Michael M. Goodwin, Scotts Valley, CA (US)

(73) Assignee: Creative Technology Ltd., Singapore (SG)

( * ) Notice: Subject to any disclaimer, the term of this patent is extended or adjusted under 35 U.S.C. 154(b) by 583 days.

(21) Appl. No.: 09/948,053

(22) Filed: Sep. 5, 2001

(65) Prior Publication Data

US 2003/0093282 A1 May 15, 2003

(51) Int. Cl.$^7$ .............................................. G10L 21/00
(52) U.S. Cl. .................... 704/500; 704/200.1; 704/203; 704/269; 704/230; 341/50; 395/238
(58) Field of Search ............................. 704/500, 200.1, 704/203, 269, 230; 341/50; 395/238

(56) References Cited

U.S. PATENT DOCUMENTS

| | | | | |
|---|---|---|---|---|
| 5,651,093 A | * | 7/1997 | Nishiguchi ................... | 704/229 |
| 6,356,211 B1 | * | 3/2002 | Shimoyoshi et al. ......... | 341/50 |
| 6,415,251 B1 | * | 7/2002 | Oikawa et al. .............. | 704/200.1 |
| 6,518,891 B2 | * | 2/2003 | Tsutsui et al. ............... | 341/50 |

OTHER PUBLICATIONS

Goodwin, Michael M., Transforming Between MDCT and DFT Representations for Audio Signal Modification, Draft paper, dated Aug. 4, 2000, 20 pages.

* cited by examiner

Primary Examiner—David L. Ometz
Assistant Examiner—Jakieda Jackson
(74) Attorney, Agent, or Firm—Schwegman, Lundberg, Woessner & Kluth, P.A.

(57) ABSTRACT

A memory-efficient system converting a signal from a first transform domain to a second transform domain. The system includes a first mechanism that obtains an input signal expressed via a first transform-domain signal representation. A second mechanism expresses the input signal via a second transform-domain signal representation without intermediate time-domain conversion. In the specific embodiment, the input signal is a Modified Discrete Cosine Transform (MDCT) signal. The second transform-domain signal representation is a Discrete Fourier Transform (DFT) signal. The second mechanism further includes a third mechanism that combines effects of an inverse MDCT, a synthesis window function, and an analysis window function, and provides a first signal in response thereto. A fourth mechanism converts the MDCT signal to the DFT signal based on the first signal. In a more specific embodiment, the synthesis window function is an MDCT synthesis window function, while the analysis window function is a DFT analysis window function. The fourth mechanism includes a mechanism for performing a fast transform on the MDCT signal and providing a first transformed signal in response thereto. The fourth mechanism further includes a mechanism for selectively delaying and updating the first transformed signal to yield second and third transformed signals, respectively, in response thereto. The fourth mechanism further includes a mechanism for operating on the first, second, and third transformed signals via third, second, and first combined window functions, respectively, and providing third, second, and first windowed signals, respectively, in response thereto. An adder adds the first, second, and third windowed functions to provide an added digital signal. An inverse DFT circuit performs an inverse DFT on the added digital signal to provide the DFT signal as output.

40 Claims, 6 Drawing Sheets

US 6,963,842 B2

EFFICIENT SYSTEM AND METHOD FOR CONVERTING BETWEEN DIFFERENT TRANSFORM-DOMAIN SIGNAL REPRESENTATIONS

COPYRIGHT NOTICE

A portion of the disclosure recited in the specification contains material which is subject to copyright protection. Specifically, a Table in accordance with 37 CFR Section 1.96 is included that lists source code instructions for a process by which aspects of the present invention are practiced in a computer system. The copyright owner has no objection to the facsimile reproduction of the specification as filed in the Patent and Trademark Office. Otherwise all copyright rights are reserved.

BACKGROUND OF THE INVENTION

1. Field of Invention

This invention relates to digital signal processing. Specifically, the present invention relates to digital systems and methods for converting between the Modified Discrete Cosine Transform (MDCT) domain and the Discrete Fourier Transform (DFT) domain.

2. Description of the Related Art

Digital systems are employed in a variety of demanding applications including radar tracking and audio applications. Such applications require fast and space-efficient digital circuits that can efficiently perform complex calculations with minimal memory.

Fast, space-efficient digital circuits are particularly important in digital audio applications, where complex coding and signal modifications are common. An exemplary digital audio system includes an input device, such as a microphone, for receiving an acoustic input signal. The microphone converts the acoustic signal to a corresponding analog electrical signal. An Analog-to-Digital Converter (ADC) samples the analog signal at a predetermined sampling rate via a quantizer to yield a digital time-domain signal. The digital time-domain signal is often converted to a spectral representation (via a process called analysis), encoded, and then transmitted across a channel or stored in memory before being decoded, modified, and then converted back to a digital time-domain signal (via a process called reconstruction or synthesis). The digital time-domain signal is often converted back to an analog signal via a Digital-to-Analog Converter (DAC). A speaker or other output device then converts the resulting analog signal into an acoustic output signal.

Before signal encoding or modification, digital time-domain signals are converted to appropriate transform-domain representations. Common transform domains include the Modified Discrete Cosine Transform (MDCT) domain and the Discrete Fourier Transform (DFT) domain. To transform a digital time-domain signal to the MDCT or DFT domains, an MDCT or a DFT, respectively, is applied to the time-domain signal. To convert an MDCT or DFT signal to the time domain, an Inverse Modified Discrete Cosine Transform (IMDCT) or an Inverse Discrete Fourier Transform (IDFT) is applied to the MDCT or DFT signal, respectively. To convert between transform domains, an MDCT or a DFT signal is typically converted to the time domain before conversion to the DFT or MDCT domains, respectively. Generally, conventional methods for converting between transform domains require intermediate conversion to the time domain.

Each domain has certain properties suitable for different applications. For example, the MDCT domain facilitates coding, while the DFT domain facilitates signal modification. The MDCT domain is used in subband coding algorithms such as AC-3, MPEG Layer 3 (MP3), and MPEG-2 Advanced Audio Coder (AAC).

Audio subband coding involves separating an audio signal into different frequency bands, which are encoded separately. The bands are typically encoded at different levels of precision based on the properties of the human auditory system. Frequency components are separated via filter banks to yield different frequency subbands. Time Domain Aliasing Cancellation (TDAC) filter banks are often used to carry out this subband separation. The overall bit rate of the audio signal is often reduced by selectively adjusting the digital sample size for each subband. Subband encoding methods are effective for achieving compression of digital signals, especially when signal energy is concentrated in a portion of the frequency band. One type of TDAC filter bank outputs MDCT-domain signals; these filter banks are central to many modern compression schemes employing subband coding, such as the Advanced Audio Coding (MPEG-2 AAC) scheme.

Unfortunately, while TDAC/MDCT signal representations facilitate coding, they typically do not facilitate signal modification and/or extraction of signal magnitude and/or phase information. Unlike DFT signal modification, MDCT signal modification interferes with aliasing cancellation in synthesis filter banks, which is required for accurate conversion of an MDCT-domain signal to the time domain.

The DFT signal representation facilitates signal modification, such as time-scaling and pitch-shifting. However, use of the DFT domain for coding is problematic, as the DFT domain lacks sufficient support for critical sampling.

Critical sampling is achieved in a representation domain when the signal representation in that domain requires only as much data as there is in the time-domain input signal. In an oversampled representation, there is more data in the representation domain than in the input signal, which is counter-productive for coding, where the goal is data reduction. Critical sampling results in fewer samples and is typically preferable to oversampling for coding applications.

For the DFT domain, critical sampling can only be achieved if the digital time-domain input signal is processed in non-overlapping blocks, but this may result in blocking artifacts in the reconstructed time-domain signal due to quantization effects. Overlap-add methods for converting between the DFT domain and the time domain reduce blocking artifacts but require oversampling. Unlike the DFT domain, the MDCT domain supports critical sampling in an overlap-add framework. Consequently, the MDCT domain is often preferable to the DFT domain for coding.

Modern digital audio systems may require modification of compressed MDCT-domain audio data that has been encoded via modern subband coding schemes. Since MDCT-domain signal component modification may cause undesirable artifacts in the reconstructed signal, MDCT signals are converted to the DFT domain before modification to avoid the introduction of undesirable artifacts in the reconstructed time-domain signals. New systems and methods for enhancing digital audio signals through modification are rapidly evolving, increasing the demand for efficient systems for converting compressed MDCT data to modification domains, such as the DFT domain.

Unfortunately, current methods for converting between MDCT and DFT domains often require lengthy processing and excess memory and hardware to accommodate intermediate time-domain processing. Existing systems generally cannot convert directly from the MDCT domain to the DFT domain or visa versa.

Hence, a need exists in the art for an efficient system and method for facilitating modification of digital audio data in systems employing subband coding schemes based on the MDCT. There exists a further need for an efficient system for converting directly between MDCT signal representations and DFT signal representations. There exists a further need for a method for converting directly between any two frequency-based domains or transform domains without requiring intermediate conversion back to the time domain.

SUMMARY OF THE INVENTION

The need in the art is addressed by the present invention, which is a system for efficiently converting a signal from a first transform-domain representation to a second transform-domain representation. In the illustrative embodiment, the inventive system is adapted for use with a digital audio device. The system includes a first mechanism for obtaining an input signal expressed via the first transform-domain signal representation. A second mechanism expresses the input signal via a second transform-domain signal representation without intermediate time-domain processing.

In a more specific embodiment, the first transform-domain signal representation is a Modified Discrete Cosine Transform (MDCT) signal representation, and the second transform-domain signal representation is a Discrete Fourier Transform (DFT) signal representation. The second mechanism further includes a third mechanism for combining an Inverse Modified Discrete Cosine Transform (IMDCT), a synthesis window function, and an analysis window function and providing a first signal in response thereto. A fourth mechanism converts the MDCT signal to a DFT signal based on the first signal.

The synthesis window function is an MDCT synthesis window function associated with the MDCT signal, while the analysis window function is a DFT analysis window function associated with the DFT domain. The fourth mechanism includes a mechanism for performing a fast transform on the MDCT signal and providing a first transformed signal ($g_i[r]$) in response thereto, which is characterized by the following equation:

$$g_i[r] = e^{-j\frac{\pi r}{n}} F_N\{X_N[i,k] e^{(j\phi_k(-1)^k}(-j)\},$$

where k and r are integer index variables; $j=\sqrt{-1}$; $F_N\{\ \}$ is a DFT function; $X_N[i,k]$ represents an N-point MDCT associated with an $i^{th}$ frame of the MDCT signal; N is the length of the N-point MDCT; and $\phi_k$ is a phase term defined by $$\phi_k = \frac{2\pi n_0}{N}(k+1),$$

where $$n_0 = \frac{N}{4} + \frac{1}{2}.$$

The fourth mechanism further includes a mechanism for selectively delaying and updating the first transformed signal to yield second and third transformed signals, respectively, in response thereto. The second transformed signal ($\bar{g}_i[r]$) is determined by the following equation:

$$\bar{g}_i[r] = g_i\left[r - \frac{N}{2}\right] \text{sgn}\left(r - \frac{N}{2}\right),$$

where sgn(r−N/2) returns +1 or −1 when the sign of (r−N/2) is positive or negative, respectively, and $$g_i\left[r - \frac{N}{2}\right]$$

represents the first transformed signal delayed by $$\frac{N}{2},$$

which is a modulo N shift, i.e., a circular shift such that the first half of a frame of size N is swapped with the second half of the frame.

The third transformed signal ($\bar{\bar{g}}_i[r]$) is determined by the following equation:

$$\bar{\bar{g}}_i[r] = \bar{g}_i\left[r - \frac{N}{2}\right] \text{sgn}\left(r - \frac{N}{2}\right),$$

where $$\bar{g}_i\left[r - \frac{N}{2}\right]$$

represents the second transformed signal delayed by $$\frac{N}{2},$$

which is also a modulo N shift.

The fourth mechanism further includes a mechanism for operating on the first, second, and third transformed signals via third, second, and first combined window functions, respectively, and providing third, second, and first windowed signals, respectively, in response thereto. The first combined window function ($\sigma_0[r]$) is determined by the following equation:

$$\sigma_0[r] = w[-r]f\left[-r + \frac{N}{2}\right] - w[N-r]f\left[\frac{3N}{2} - r\right],$$

where w[n] is the DFT analysis window function; f[n] is the MDCT synthesis window function; the window functions w[r], f[r], and $\sigma_0[r]$, $\sigma_1[r]$, and $\sigma_2[r]$ are only defined on the interval 0≤r≤N−1 and are zero-valued outside this window by definition; and r and N are as defined above.

The second combined window function ($\sigma_1[r]$) is given by the following equation:

$$\sigma_1[r] = w[-r]f[-r] - w[N-r]f[N-r].$$

The third combined window function ($\sigma_2[r]$) is given by the following equation:

$$\sigma_2[r] = w[-r]f\left[-r-\frac{N}{2}\right] - w[N-r]f\left[\frac{N}{2}-r\right].$$

The fourth mechanism includes an adder for adding the first, second, and third windowed functions and providing an added digital signal in response thereto. An Inverse Discrete Transform (IDFT) circuit performs an Inverse Discrete Fourier Transform (IDFT) on the added digital signal and provides the DFT signal as output in response thereto.

The novel design of the present invention is facilitated by the second mechanism, which converts an MDCT signal directly to a DFT signal, eliminating intermediate time-domain processing, which would require extra memory. This is particularly useful in audio coding applications where the MDCT signal requires component modification. By efficiently converting the MDCT signal directly to the DFT domain before signal modification, undesirable artifacts in the reconstructed signal are minimized.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
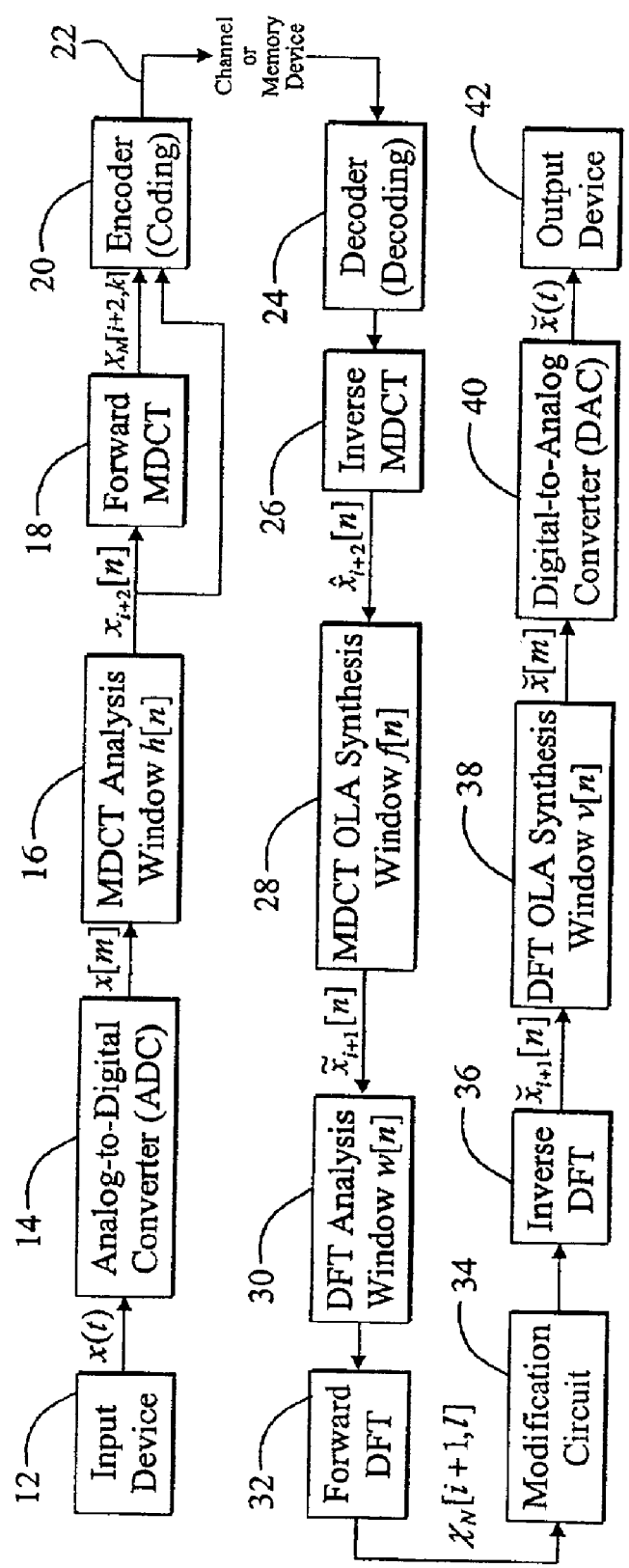
FIG. 1 is a diagram of a digital audio system of the present invention that converts from the MDCT domain to the DFT domain by first converting to the time domain.

FIG. 1 is a diagram of a digital audio system 10 of the present invention that converts from the Modified Discrete Cosine Transform (MDCT) domain to the Discrete Fourier Transform (DFT) domain via intermediate time-domain conversion. For clarity, various components, such as window switching circuitry, psychoacoustic information extraction circuitry, power supplies, clocks, and amplifiers, are omitted from FIG. 1, however one skilled in the art with access to the present teachings will know how to implement the additional components required for a given application.

The digital audio system 10 includes an input device 12 that provides an analog output signal to an Analog-to-Digital Converter (ADC) 14. The ADC 14 provides a digital time-domain output signal to an MDCT analysis window circuit (h[n]) 16. An output of the MDCT analysis window circuit 16 is input to a forward MDCT circuit 18 and to the MDCT analysis window circuit 16. The MDCT analysis window circuit 16 provides the time-domain signal to the encoder 20 enabling the encoder 20 to extract necessary psychoacoustic information from an output of the forward MDCT circuit 18. In some implementations, psychoacoustic information is extracted by the encoder 20 directly from the MDCT-domain signal output from the forward MDCT circuit 18.

The output of the forward MDCT circuit 18 is input to an encoder 20. The encoder 20 is connected to a decoder 24 via a channel or memory device 22. An output of the decoder 24 is input to an inverse MDCT circuit 26. An output of the inverse MDCT circuit 26 is input to an MDCT Overlap-Add (OLA) synthesis window circuit (f[n]) 28, which includes an OLA circuit and a synthesis window circuit (not shown). An output of the OLA synthesis window circuit 28 is input to a DFT analysis window circuit (w[n]) 30. An output of the DFT analysis window circuit 30 is input to a forward DFT circuit 32. An output of the forward DFT circuit 32 is input to a modification circuit 34. An output of the modification circuit 34 is input to an inverse DFT circuit 36. An output of the inverse DFT circuit 36 is input to a DFT OLA synthesis window circuit 38. An output of the second OLA synthesis window circuit 38 is input to a Digital-to-Analog Converter (DAC) 40, which provides an analog output signal ($\check{x}(t)$) to an output device 42, such as a speaker.

For the purposes of the present discussion, the terms frequency domain, transform domain, and spectral domain are employed interchangeably. Furthermore, a signal expressed in terms of its MDCT-domain signal representation is called an MDCT signal, while a signal expressed in terms of its DFT-domain signal representation is called a DFT signal. In the specific embodiments disclosed herein, a DFT signal or an MDCT signal includes a sequence of blocks or frames. Each frame contains spectral data corresponding to a segment of the time-domain input signal.

In operation, the input device 12, such as a microphone, provides an analog electrical signal (x(t)) to the ADC 14. The ADC 14 samples the analog signal x(t) at a predetermined sampling rate via a quantizer, which outputs a sequence of digital values (x[m]) corresponding to the analog samples taken at discrete times m, where m is a digital time variable that is unbounded by data frame size. An exemplary range for m is: $0 \leq m < \infty$, where the first sample of the sequence x[m] occurs when m=0. The sequence of digital values x[m] is a digital time-domain output signal x[m] that is input to the MDCT analysis window circuit 16.

Many practical applications, such as audio processing applications, must accommodate a lengthy input sequence x[m]. Subband filtering performed via a DFT or MDCT involves operations on blocks of data of length N, which are processed successively. N is limited by hardware constraints, such as memory limitations. Consequently, the input sequence x[m] is segmented or windowed by the MDCT analysis window circuit 16 into fixed size blocks (called frames) of length N before sequential processing of the blocks via MDCT-domain signal processing. The blocks are reassembled via the Overlap-Add (OLA) method as implemented in the OLA synthesis window circuits 28 and 38, which include window blocks and OLA blocks (not shown). The Overlap-Add process synthesizes the digital signal $\check{x}[m]$.

Generally, N is an even integer to facilitate the application of Fast Fourier Transform (FFT) algorithms. In the present example, each frame of length N includes L new data samples from the input sequence x[m] and the last N–L samples from the previous data block. L is referred to as the inter-frame stride or hop size, and in many processing scenarios, it is set equal to N/2.

The MDCT analysis window circuit 16 operates on the digital time-domain signal x[m] via an analysis window function (h[n]) before application of a forward MDCT via the forward MDCT circuit 18. An exemplary analysis window function h[n] is described by the following equation:

$$h[n] = \sqrt{2} \sin\left[\frac{\pi}{N}\left(n + \frac{1}{2}\right)\right], \quad [1]$$

where N is a predetermined integer constant representing the sequence length; and n is an integer time variable such that $0 \leq n \leq N-1$, and h[n]=0 or is undefined outside this range.

The analysis window function h[n] of equation (1) satisfies well-known reconstruction conditions for facilitating perfect reconstruction of an MDCT signal back to a time-domain signal. For a running MDCT, the perfect reconstruction conditions are defined by the following equations:

$$f[n]h[n] + f\left[n + \frac{N}{2}\right]h\left[n + \frac{N}{2}\right] = 2, \quad [2]$$

$$f[n]h\left[\frac{N}{2} - 1 - n\right] - f\left[n + \frac{N}{2}\right]h[N - 1 - n] = 0, \quad [3]$$

where $$0 \leq n \leq \frac{N}{2} - 1;$$

is the MDCT analysis window function; f[n] is the MDCT synthesis window function implemented by the MDCT OLA synthesis window circuit 28; N is the window length; and N/2 is the inter-frame stride.

The conditions of equations (2) and (3) are satisfied if the MDCT window functions h[n] and f[n] meet the following constraints:

$$f[n] = h[n] \quad 0 \leq n \leq N - 1, \quad [4]$$

$$h[n] = h[N - 1 - n] \quad 0 \leq n \leq \frac{N}{2} - 1, \quad [5]$$

$$h[n]^2 + h\left[n + \frac{N}{2}\right]^2 = 2 \quad 0 \leq n \leq \frac{N}{4} - 1, \quad [6]$$

where equation (4) is a constraint applied to the entire window length N of the windows associated with the MDCT window functions f[n] and h[n]; equation (5) applies to the first half of the MDCT analysis window h[n]; equation (6) applies to the first quarter of h[n]. The conditions or constraints specified in equations (4) through (6) apply to the entire length N of each window. Given the window symmetries, however, it is redundant to check if the conditions are met outside of the specified ranges for n.

The forward MDCT circuit 18 outputs an MDCT signal $X_N[i+2,k]$, which is an MDCT-domain representation of the windowed frame i+2 of the digital time-domain signal $x_{i+2}[n]$ output from the MDCT analysis window circuit 16. The MDCT signal $X_N[i+2,k]$ is described in terms of frame i+2 rather than frame i or frame i+1 to simplify notation later. Initially frame i propagates through the system 10, followed by frames i+1 and i+2. However, as discussed more fully below, frame i and frame i+2 are employed to compute the DFT for frame i+1. Hence, frames i and i+2 should propagate through the system 10 before the DFT is determined for frame i+1.

The MDCT is defined by the following equations:

$$X_N[i+2, k] = \sum_{n=0}^{N-1} x_{i+2}[n]\cos\left[\frac{2\pi}{N}(n + n_0)\left(k + \frac{1}{2}\right)\right] \text{ and} \quad [7]$$

$$n_0 = \frac{N}{4} + \frac{1}{2}, \quad [8]$$

where i is a frame index; k is a transform index, also called a frequency index; and the remaining variables are as described above.

The MDCT as defined in equations (7) and (8) may be implemented via a Fast Fourier Transform (FFT) algorithm, where symmetries of the MDCT are exploited to minimize computational complexity.

The MDCT $X_N[i+2,k]$ for a given frame i+2 of length N includes N coefficients, one coefficient for each value of k between 0 and N–1. However, $X_N[i+2,k]$ exhibits symmetry when N is even. If N/2 is even, then $X_N[i+2,k]$ is odd-symmetric. If N/2 is odd, then $X_N[i+2,k]$ is even-symmetric. Generally, N/2 is chosen to be even (a power of two) to facilitate fast MDCT computations. A given sequence a[n] is even symmetric if a[n]=a[–n] and odd symmetric if a[–n]=–a[n].

Even samples ($X_N[i+2,2k]$ for k=0 to N/2–1) of the MDCT may be computed from an N/4-point Inverse DFT (IDFT). The first half of the even samples ($X_N[i+2,2k]$ for k=0 to N/2–1) is denoted $X_N[i+2,2k]$, where k=0 to N/4–1. The second half of the even samples is denoted $$X_N\left[i + 2, 2k + \frac{N}{2}\right],$$

where k=0 to N/4–1. The even samples of $X_N[i+2,k]$ are determined in accordance with the following equations:

$$X_N\left[i+2, 2k + \frac{N}{2}\right] + jX_N[i+2, 2k] = \quad [9]$$

$$\frac{N}{4}(-1)^{k+1} e^{-j\frac{\pi(N-2)}{4N}} e^{j\frac{2\pi k}{N}} F_{\frac{N}{4}}^{-1}\left\{\hat{x}_{i+2}[n] e^{j\frac{2\pi n}{N}}\right\}$$

$$\hat{x}_{i+2}[n] = \quad [10]$$

$$\left(x_{i+2}[2n] - x_{i+2}\left[\frac{N}{2} - 2n - 1\right]\right) + j\left(x_{i+2}[N - 2n - 1] + x_{i+2}\left[2n + \frac{N}{2}\right]\right),$$

where $$0 \leq k \leq \frac{N}{4} - 1;$$

the function $$F_{\frac{N}{4}}^{-1}\{\ \}$$

is an N/4-point IDFT; $x_{i+2}[n]$ represents the time-domain sequence for which the forward MDCT representation is desired; and where the remaining variables and functions are as described above.

The left side of equation (9) includes the real and imaginary components $$X_N\left[i+2, 2k+\frac{N}{2}\right] \text{ and } X_N[i+2, 2k]$$

and $X_N[i+2,2k]$ where $$0 \leq k \leq \frac{N}{4} - 1,$$

respectively, which represent the second half and the first half of the even samples of the MDCT signal $X_N[i+2,k]$, where $0 \leq k \leq N-1$, respectively.

Since the MDCT of equation (7) is odd-symmetric when N/2 is even, the odd samples of the MDCT are given by the following equation:

$$X_N[i+2, N-2k-1] = -X_N[i+2, 2k] \quad 0 \leq k \leq \frac{N}{2} - 1. \quad [11]$$

The MDCT formulations of equations (9) through (11) implement an exemplary fast algorithm, which is known in the art for computing the forward MDCT. Those skilled in the art will appreciate that other fast algorithms may be employed to compute the forward MDCT without departing from the scope of the present invention.

Digital time-domain signals are often converted to MDCT signal representations before encoding via the encoder 20. In the present example, the encoder 20 employs psychoacoustics and entropy coding to compress the MDCT signal $X_N[i+2,k]$ before transmission across a channel or storage in computer memory (see channel or memory 22).

The encoder 20 quantizes the spectral coefficients of the MDCT signal $X_N[i+2,k]$ according to psychoacoustic principles so that more bits are used in the subbands where the human ear is more sensitive to errors and so that fewer bits are used in the subbands where errors are masked or imperceptible. The encoder 20 then encodes these quantized values using a lossless entropy coding scheme, such as Huffman or arithmetic coding. In addition, the encoder 20 implements bit-stream packing to structure the signal for transmission or storage. The encoder 20 is a generalized block that may be constructed by one skilled in the art with access to the present teachings.

MDCT-domain signal processing includes signal encoding via the encoder 20 and decoding via the decoder 24. The MDCT signal input to the encoder 20 may be interpreted as a set of subband signals, with the forward MDCT circuit 18 being implemented via a subband filter bank. The encoder 20 reduces the amount of data used to represent these subband signals using psychoacoustics, Huffman coding, and/or other techniques.

In the exemplary digital audio system 10, the encoder 20 implements one or more compression algorithms, such as the quantization of the MDCT signal based on perceptual principles and/or entropy coding of the quantized values using Huffman or arithmetic coding. The resulting compressed signal is then transmitted across a channel, such as a network link, or stored on a hard drive or other media 22 before being decompressed or decoded via the decoder 24.

After decoding, an inverse MDCT (IMDCT) is applied to the data via the IMDCT circuit 26 to yield a digital sequence $\hat{x}_{i+2}[n]$, corresponding to frame i+2. The inverse MDCT (IMDCT) $\hat{x}_{i+2}[n]$ for a given frame i+2 of length N is defined by the following equation:

$$\hat{x}_{i+2}[n] = \frac{1}{N}\sum_{n=0}^{N-1} X_N[i+2, k]\cos\left[\frac{2\pi}{N}(n+n_0)\left(k+\frac{1}{2}\right)\right], \quad [12]$$

where the variables are as described above. The computation of equation (12) may be simplified by exploiting symmetries of the IDFT as discussed more fully below.

The form of the IMDCT of equation (12) is similar to the form of the MDCT of equation (7). Consequently, the even samples of the IMDCT are given by the following equations, which are similar to equations (9) and (10):

$$\hat{x}_{i+2}\left[2n+\frac{N}{2}\right] + j\hat{x}_{i+2}[2n] = \quad [13]$$

$$\frac{\sqrt{2}}{4} e^{j\frac{\pi}{2N}} e^{j\frac{2\pi n}{N}} F_{\frac{N}{4}}^{-1}\left\{\dot{X}_N[i+2, k](-1)^{k+1} e^{j\frac{2\pi k}{N}}\right\}$$

$$\dot{X}_N[i+2, k] = \left(X_N[i+2, 2k] - X_N\left[i+2, 2k+\frac{N}{2}\right]\right) + \quad [14]$$

$$j\left(-X_N[i+2, 2k] + X_N\left[i+2, 2k+\frac{N}{2}\right]\right),$$

where $$0 \leq n \leq \frac{N}{4} - 1;$$

the function $$F_{\frac{N}{4}}^{-1}\{\ \}$$

is a quarter-point IDFT (having length N/4);

$$\hat{x}_{i+2}\left[2n+\frac{N}{2}\right]$$

represents the second half of the even samples of the time-domain output signal $\hat{x}_{i+2}[n]$; $\hat{x}_{i+2}[2n]$ represents the first half of the even samples of the output signal; and the function $X_N[k]$ is an N-point MDCT.

The odd samples of the IDFT are given by the following equations:

$$\hat{x}_{i+2}[N - 2n - 1] = \begin{cases} \hat{x}_{i+2}\left[2n + \frac{N}{2}\right] & 0 \leq n \leq \frac{N}{4} - 1 \\ -\hat{x}_{i+2}\left[2n - \frac{N}{2}\right] & \frac{N}{4} \leq n \leq \frac{N}{2} - 1 \end{cases} \quad [15]$$

The IMDCT formulations of equations (13) through (15) implement an exemplary fast algorithm for computing the IMDCT. Those skilled in the art will appreciate that other fast algorithms may be employed to compute the IMDCT without departing from the scope of the present invention.

The digital sequence $\hat{x}_{i+2}[n]$ output from the inverse MDCT circuit 26 includes time-domain aliasing components, which are cancelled via an overlap-add process implemented via the MDCT OLA synthesis window circuit 28. The MDCT OLA synthesis window circuit 28 implements the synthesis window function $f[n]$ to fit the frames together and properly cancel the time-domain aliasing components to yield an output sequence $\tilde{x}_{i+1}[n]$ based on frames i, i+1 and i+2. An exemplary synthesis window function is defined such that $f[n]=h[n]$, which is described in equation (1) and satisfies the perfect reconstruction constraints of equations (4) through (6). Those skilled in the art will appreciate that other functions may be chosen for $f[n]$ without departing from the scope of the present invention.

The output sequence $\tilde{x}_{i+1}[n]$ of the MDCT OLA synthesis window circuit 28 is a reconstructed time-domain signal. The output time-domain sequence $\tilde{x}_{i+1}[n]$ is first converted to a suitable modification domain, such as the DFT domain, before signal component modification by the modification circuit 34. The DFT domain is a well-known modification domain suitable for various audio signal modifications, such as time-scaling and pitch-shifting.

The time-domain sequence $\tilde{x}_{i+1}[n]$ is input to the DFT analysis window circuit 30, which implements the window function $w[n]$ and outputs a windowed signal in response to $\tilde{x}_{i+1}[n]$. A forward DFT is applied to the windowed signal via the forward DFT circuit 32. The forward DFT ($\chi_M[i+1,k]$) for frame i+1 is defined by the following equation:

$$\chi_M[i+1,k] = F_M\{x_{i+1}[n]\} = \sum_{n=0}^{N-1} x_{i+1}[n]e^{-j\frac{2\pi nk}{M}}, \quad [16]$$

where $\chi_M[i+1,k]$ is an M-point DFT of an N-sample portion of the sequence $x_{i+1}[n]$, and where k is the transform index. When M>N, the DFT is oversampled. When M≧N, an IDFT of $\chi_M[i+1,k]$ will yield the original N-sample portion of the sequence $x_{i+1}[n]$.

Various Fast Fourier Transform (FFT) algorithms may be employed to compute the DFT of equation (16). Generally, FFT algorithms exploit symmetries of the kernel $$e^{-j\frac{2\pi nk}{M}}$$

of the DFT to reduce the computational complexity of computing the DFT of equation (16) directly. Direct computation of the DFT of equation (16) requires on the order of $2M^2$ multiplications, while various FFT algorithms require on the order of M log M multiplications.

Methods for exploiting the symmetries of the DFT include the decimation-in-frequency approach and the decimation-in-time approach. The decimation-in-frequency approach is based on decomposition of an M-point DFT into successively smaller DFT's of sums of subsequences of the input signal. The decimation-in-time approach involves splitting the input sequence into even and odd samples via decimation (downsampling) by a factor of 2 and decomposing the M-point DFT into first and second smaller DFT's of the even and odd samples. Those skilled in the art will appreciate that other methods for computing the DFT may be employed without departing from the scope of the present invention.

The forward DFT computation circuit 32 computes the DFT via an FFT algorithm to yield the N-Point DFT $\chi_N[i+1,l]$, where i is the frame index, and l is a frequency or transform index. The resulting N-Point DFT $\chi_N[i+1,l]$ is input to the modification circuit 34. The DFT $\chi_N[i+1,l]$ is described with respect to frame i+1 to simplify later notation. The modification circuit 34 performs signal component modifications, such as time-scaling and pitch-shifting, and provides the modified signal to the inverse DFT circuit 36. Note that the present discussion assumes that frame i+2 is being processed and that frames i+1 and i have already gone through the system 10 so that the DFT of frame i+1 is the output of the forward DFT circuit 32. Similarly, if frame i were being processed, frames i−1 and i−2 would have already gone through the system 10, so the DFT of frame i−1 would be the output of the forward DFT circuit 32.

Generally, the design of the DFT synthesis and DFT analysis window functions $w[n]$ and $v[n]$ and associated circuits 30 and 38, respectively, does not limit modifications to be performed by the modification circuit 34 in the DFT domain. However, suppression of blocking artifacts in the associated reconstructed signal may introduce additional window design constraints, which may be determined by one skilled in the art.

For the purposes of the present discussion, a compression domain is a transform domain suitable for signal coding and compression applications. A modification domain is a transform domain suitable for signal component modification. The MDCT domain is a compression domain, while the DFT domain is a modification domain. A transform domain is suitable for a given application when its use in that application does not cause prohibitive effects. For modification, it is prohibitive to introduce undesirable artifacts in the corresponding reconstructed signal, which may occur during MDCT-domain modification; for compression, it is prohibitive to introduce more data to the signal than is required to represent the input signal. Such excess data may be required during DFT-domain compression.

Typically an MDCT signal contains the same amount of data as the original time-domain input signal, while a DFT signal typically contains twice as much data as the original signal when used in an OLA processing scheme with an inter-frame stride of N/2. The large number of DFT samples makes DFT-domain compression undesirable. The present invention facilitates modification of compression-domain signals via conversion to a modification domain, such as the DFT domain.

Frequency-domain coding and modification often affords computational advantages over corresponding time-domain coding and modification. These advantages are enhanced by various Fast Fourier Transform (FFT) algorithms, which facilitate efficient conversion between time-domain and frequency-domain signal representations, such as MDCT or DFT representations. Furthermore, frequency-domain processing is often required by particular modification schemes. Generally, the frequency domain is preferred for coding, which facilitates accommodation of frequency-domain properties of the human auditory system.

The DFT can be modified via the modification circuit 34 in various musically meaningful ways. Synthesis is achieved by using an IDFT and an overlap-add scheme via the circuits 36 and 38, respectively, or by mapping the DFT back into the MDCT domain and then using a TDAC synthesis filter bank, as discussed more fully below.

The inverse DFT circuit 36 computes the IDFT via an FFT algorithm. The M-point inverse DFT ($\hat{x}_{i+1}[n]$) for a given frame of length N is defined by the following equation:

$$\hat{x}_{i+1}[n] = F_M^{-1}\{\chi_M[i+1,k]\} = \frac{1}{M}\sum_{k=0}^{M-1}\chi_M[i+1,k]e^{j\frac{2\pi nk}{M}}, \quad [17]$$

where the variables are as described above.

An inverse N-point DFT (M=N in this case) is computed for each frame i+1 and then input to the OLA synthesis window circuit 38. The OLA synthesis window circuit 38 implements a synthesis window function $v[n]$, which assembles the frames of length N via an overlap-add process to reconstruct the signal. In the DFT case, there are no time-domain aliasing components to be cancelled.

The DFT synthesis window function v[n] and the DFT analysis window function w[n] are chosen to meet reconstruction conditions such that when the conditions are met, a given time-domain signal may be converted to the DFT domain and then back to the time domain without loss of information. The reconstruction conditions for the running DFT or the short-time Fourier transform (STFT) are given by the following equation:

$$\sum_i w[n-iL]v[n-iL] = 1, \qquad [18]$$

where i is a frame index corresponding to the frame number; and L is the inter-frame stride, which is N/2 in the present specific embodiment.

A digital synthesized time-domain signal ($\check{x}[m]$) is output from the OLA synthesis window circuit 38 and is a modified version of the time-domain signal x[m] output from ADC 14. The modification circuit 34 performed the modifications. The reconstructed digital time-domain signal $\check{x}[m]$ output from the OLA synthesis circuit 38 is input to the DAC 40, which converts the digital signal $\check{x}[m]$ to a corresponding analog signal $\check{x}(t)$. The analog signal $\check{x}(t)$ is then input to the output device 42, which outputs acoustic signals, such as music or voice, corresponding to the analog signal $\check{x}(t)$ In audio processing applications, the DFT and MDCT are typically used in a sliding-window fashion. Namely, during analysis, a segment of the input data is extracted by an analysis window (h[n] or w[n]) before the DFT or MDCT is applied. During synthesis, a synthesis window is applied after application of the inverse transform. Subsequently, a desired time-domain signal is reconstructed from successive synthesis frames via an overlap-add procedure.

Hence, in the audio system 10, the MDCT analysis window circuit 16 windows (via window w[n]) the digital input signal x[m] and provides a windowed signal $x_{i+2}[n]$ to the forward MDCT circuit 18, which applies a forward MDCT to the windowed signal $x_{i+2}[n]$. Coding gain is achieved via the encoder 20, which accounts for quantization, application of a psychoacoustic model to remove perceptually unnecessary details, entropy coding, etc. The encoded signal is then transferred to the decoder 24 via the channel or memory device 22. The decoder 24 subsequently outputs a corresponding sequence of MDCT coefficients.

Signal modification in the DFT domain is achieved by implementing an inverse MDCT of the sequence of MDCT coefficients and employing an OLA process (with an appropriate window function $f[n]$) to reconstruct a perceptually equivalent version ($\tilde{x}[n]$) of the digital input signal x[m]. A block of the resulting signal $\tilde{x}_{i+1}[n]$ is then windowed via the DFT analysis window circuit 30 (window w[n]) and transformed into a DFT representation by the forward DFT circuit 32. After signal component modifications implemented via the modification circuit 34, the inverse DFT circuit 36 and OLA synthesis window circuit 38 (window v[n]) synthesize the modified time-domain signal $\check{x}[m]$.

Those skilled in the art will appreciate that while the embodiments of the present invention discussed more fully below are adapted for use with the MDCT formulations of equations (9) through (11) and the IMDCT formulations for equations (13) through (15), other algorithms may be substituted by one skilled in the art without departing from the scope of the present invention.

Figure 2:
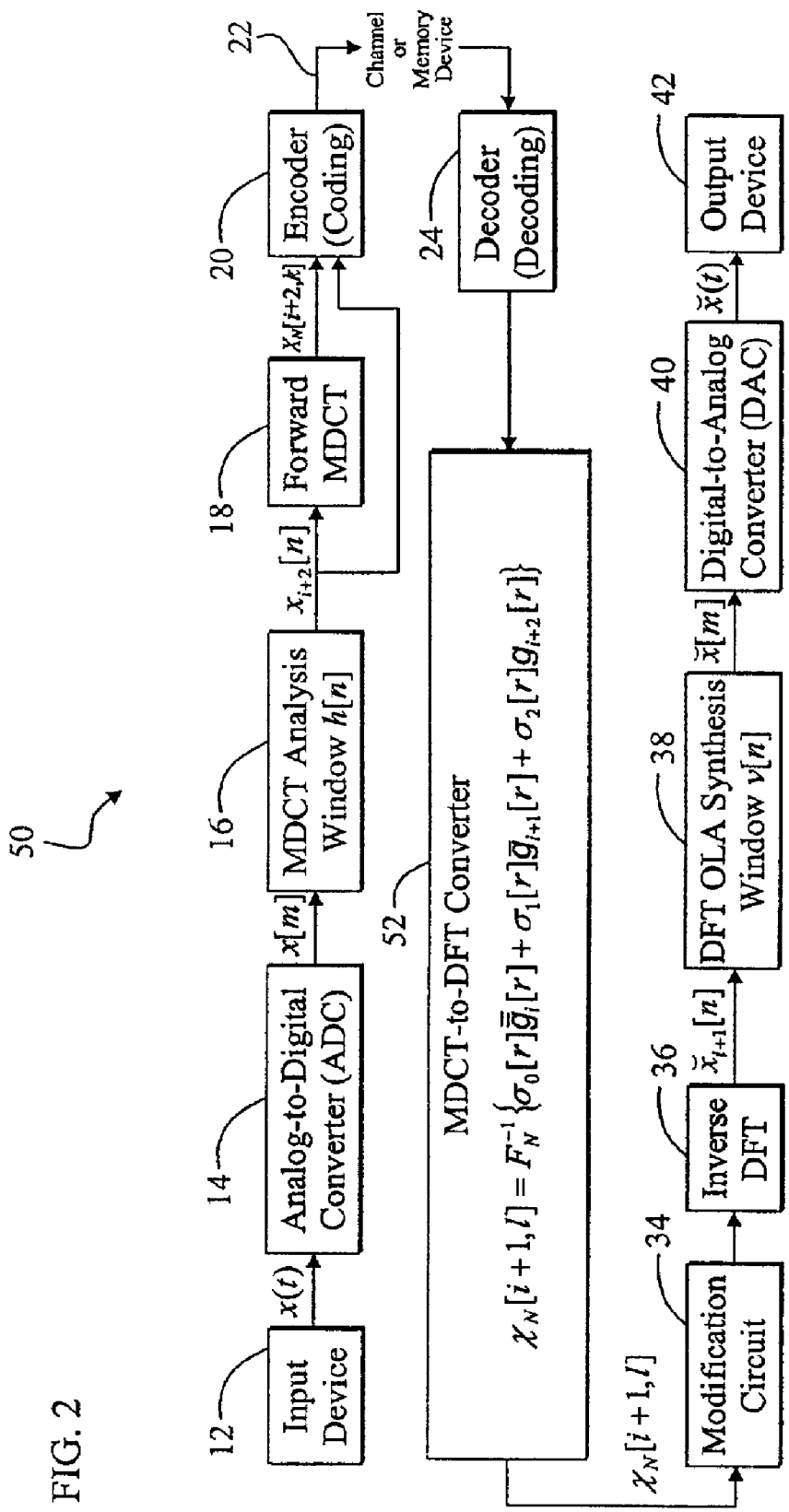
FIG. 2 is a diagram of an efficient digital audio system constructed in accordance with the teachings of the present invention and having an MDCT-to-DFT converter.

FIG. 2 is a diagram of an efficient digital audio system 50 constructed in accordance with the teachings of the present invention that converts directly from the MDCT domain to the DFT domain. For clarity, various components, such as window switching circuitry, psychoacoustic information extraction circuitry, power supplies, clocks, and amplifiers, are omitted from FIG. 2, however one skilled in the art with access to the present teachings will know how to implement the additional components required for a given application.

The present invention is discussed with respect to digital audio systems. However, the system of the present invention may be employed in different systems, such as video processors, without departing from the scope of the present invention.

The efficient digital audio system 50 is similar to the digital audio system 10 of FIG. 1 with the exception that the inverse MDCT circuit 26, the OLA synthesis window circuit 28, the DFT analysis window circuit 30, and the Forward DFT circuit 32 in FIG. 1 are replaced by an efficient MDCT-to-DFT converter 52 in FIG. 2. The MDCT-to-DFT converter 52 converts MDCT signal representations directly to corresponding DFT signal representations without inefficient intermediate conversion back to the time domain. The amount of memory required to implement the MDCT-to-DFT converter 52 is less than the memory required for implementing the circuits 26 through 32 of FIG. 1, as discussed more fully below. Note that aliasing cancellation is implemented explicitly in the system 10 of FIG. 1 and implicitly in the system 50 of FIG. 2.

The MDCT-to-DFT converter 52 employs the following unique MDCT-to-DFT conversion equation to convert signals directly from the MDCT domain to the DFT domain:

$$\chi_N[i+1,l] = F_N^{-1}\{\sigma_0[r]\bar{\bar{g}}_i[r] + \sigma_1[r]\bar{g}_{i+1}[r] + \sigma_2[r]g_{i+2}[r]\}, \qquad [19]$$

where $\chi_N[i+1,l]$ is the N-point DFT for frame i+1 of the digital signal output from the decoder 24; i is a frame index; l is a digital time variable representing the frequency index of $\chi_N[i,l]$; N is a predetermined integer corresponding to the length of the N-point DFT, which also corresponds to the block size or frame size employed for processing; $F_N^{-1}\{\ \}$ is an N-point inverse DFT function that operates on $\sigma_0[r]\bar{\bar{g}}_i[r] + \sigma_1[r]\bar{g}_{i+1}[r] + \sigma_2[r]g_{i+2}[r]$; r is an integer variable representing an index into the sequence to be processed by the inverse DFT and is the internal variable of the IDFT which is mapped to the frequency variable l by the IDFT; $\sigma_0[r]$, $\sigma_1[r]$, and $\sigma_2[r]$ are first, second and third combined window functions, respectively, that represent the combined effects of a predetermined MDCT synthesis window function $f[n]$ and a DFT analysis window function w[n] associated with a first frame, a second frame, and a third frame, respectively; $g_{i+2}[r]$ is a function of a DFT of an MDCT associated with frame i+2 of the decoded signal; $\bar{g}_{i+1}[r]$ is a delayed version of a $g_{i+1}[r]$ function associated with frame i+1 of the decoded signal; $\bar{\bar{g}}[r]$ is a delayed version of $\bar{g}_i[r]$, which is a delayed version of a function $g_i[r]$ associated with frame i of the decoded signal.

Figure 3:
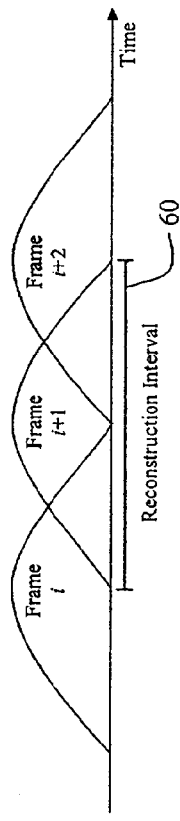
FIG. 3 is a diagram depicting a reconstruction interval employed by the MDCT-to-DFT converter of FIG. 2.

In an implementation, the MDCT-to-DFT conversion of equation (19), when applied to a given frame, employs previous and subsequent frames (if available) for conversion of the frame from the MDCT to the DFT domain as shown in FIG. 3.

FIG. 3 is a diagram depicting an exemplary reconstruction interval 60 employed by the MDCT-to-DFT converter 52 of FIG. 2. For frame i+1, the reconstruction interval overlaps half of frame i, half of frame i+2, and all of frame i+1. The MDCT-to-DFT converter 52 of FIG. 2 employs MDCT signals from the three overlapping frames i, i+1, and i+2 to create a DFT signal for the indicated reconstruction interval 60, which corresponds to frame i+1.

Figure 4:
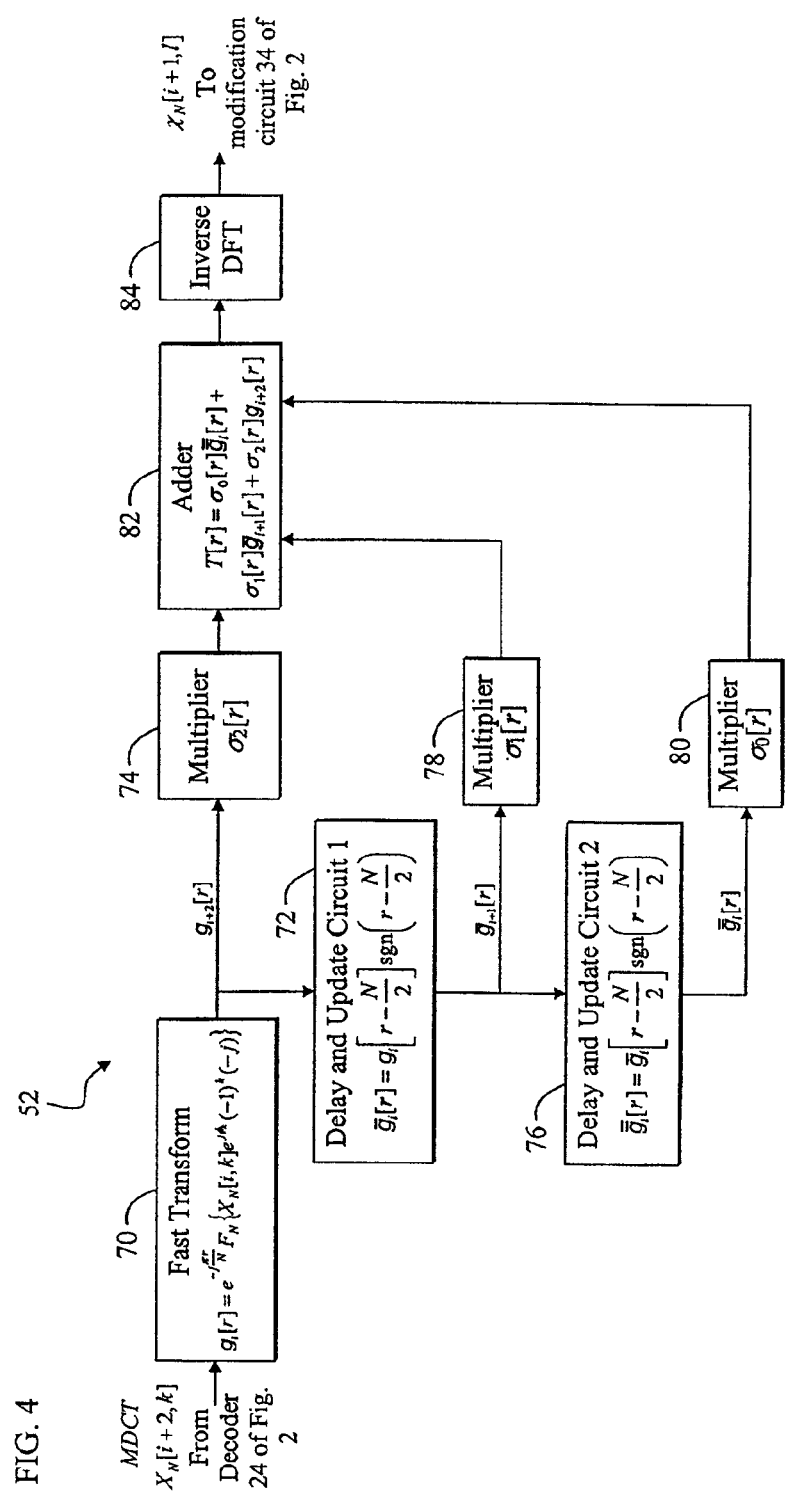
FIG. 4 is a more detailed diagram of the MDCT-to-DFT converter of FIG. 2.

FIG. 4 is a more detailed diagram of the MDCT-to-DFT converter 52 of FIG. 2. The MDCT-to-DFT converter 52 includes a fast transform circuit 70, which receives input from the decoder 24 of FIG. 2 and provides output to a first delay and update circuit 72 and to a third σ multiplier ($\sigma_2[r]$) 74. An output of the first delay and update circuit 72 is connected to an input of a second delay and update circuit 76 and to an input of a second σ multiplier ($\sigma_1[r]$) 78. An output of the second delay and update circuit 76 is input to a first σ multiplier ($\sigma_0[r]$) 80. Outputs of the first σ multiplier 80, the second σ multiplier 78, and the third σ multiplier 74 are input to an adder 82. An output of the adder 82 is input to an IDFT circuit 84. The output of the IDFT circuit 84 represents the DFT $\chi_N[i+1,1]$ of equation (19) and is input to the modification circuit 34 of FIG. 2.

The fast transform circuit 70 employs a fast transform algorithm to implement the function $g_i[r]$, which corresponds to a first transformed signal output by the fast transform circuit 70. The function $g_i[r]$ is employed in equation (19) and in the corresponding MDCT-to-DFT converter 52 and is defined by the following equation:

$$g_i[r] = e^{-j\frac{\pi r}{N}} F_N \{X_N[i,k] e^{j\phi_k} (-1)^k (-j)\}, \quad [20]$$

where k is an integer frequency index variable; r is an index variable for the DFT; $j=\sqrt{-1}$; $F_N\{\ \}$ is the DFT function; $X_N[i,k]$ represents an N-point MDCT associated with an $i^{th}$ frame of the corresponding MDCT signal and associated with an $i^{th}$ windowed frame of the corresponding time-domain signal; N is the length of the N-point MDCT; and $\phi_k$ is a phase term defined by $$\phi_k = \frac{2\pi n_0}{N}\left(k + \frac{1}{2}\right), \text{ where } n_0 = \frac{N}{4} + \frac{1}{2}.$$

The function $\bar{g}_{i+1}[r]$ is employed in equation (19) and represents a second transformed signal associated with frame i+1 and output by the first delay and update circuit 72. For clarity, the operation of the fast transform circuit 70 and the delay and update circuits 72 and 76 are discussed with reference to the general subscript i rather than i+1 and/or i+2. In general, the function $\bar{g}_i[r]$ is a circularly shifted (delayed by modulo N) version of the $g_i[r]$ as described by the following equation:

$$\bar{g}_i[r] = g_i\left[r - \frac{N}{2}\right] \text{sgn}\left(r - \frac{N}{2}\right), \quad [21]$$

where $$g_i\left[r - \frac{N}{2}\right]$$

represents the first transformed signal $g_i[r]$ delayed by $$\frac{N}{2};$$

which is a modulo N shift, i.e., a circular shift such that the first half of a frame of size N is swapped with the second half of the frame;

$$\text{sgn}\left(r - \frac{N}{2}\right)$$

returns the sign (positive or negative) of $$r - \frac{N}{2};$$

and the remaining variables are as described above.

Similarly, the function $\bar{g}_{i+2}[r]$ is employed in equation (19) and represents a third transformed signal associated with frame i+2 and output by the second delay and update circuit 76. In general, the function $\bar{\bar{g}}_i[r]$ is a circularly shifted version of the function $\bar{g}_i[r]$ as described by the following equation:

$$\bar{\bar{g}}_i[r] = \bar{g}_i\left[r - \frac{N}{2}\right] \text{sgn}\left(r - \frac{N}{2}\right), \quad [22]$$

where $$\bar{g}_i\left[r - \frac{N}{2}\right]$$

represents the second transformed signal circularly delayed by $$\frac{N}{2};$$

and the remaining terms are as described above.

The first σ multiplier 80 multiplies the signal output from the second delay and update circuit 76 (which corresponds to the results of equation (22)) by $\sigma_0[r]$. $\sigma_0[r]$ represents a first combined window function that selectively combines the OLA synthesis window function $f[n]$ and the DFT analysis window function $w[n]$ of the window circuits 28 and 30, respectively, of FIG. 1 in accordance with the following equation:

$$\sigma_0[r] = w[-r]f\left[-r + \frac{N}{2}\right] - w[N-r]f\left[\frac{3N}{2} - r\right], \quad [23]$$

where the functions $w[n]$ and $f[n]$ are analysis and synthesis window functions, respectively; and r and N are as defined above. The functions $\sigma_0[n]$, $w[n]$, $f[n]$, and the functions $\sigma_1[n]$ and $\sigma_2[n]$ discussed below, are defined as zero everywhere outside the range $0 \leq n \leq N-1$.

The second σ multiplier 78 multiplies the signal output from the first delay and update circuit 72, which corresponds to the results of equation (21) (but for frame i+1) by $\sigma_1[r]$. $\sigma_1[r]$ represents a second combined window function that selectively combines the OLA synthesis window function $f[n]$ and the DFT analysis window function $w[n]$ of the window circuits 28 and 30, respectively, of FIG. 1 in accordance with the following equation:

$$\sigma_1[r] = w[-r]f[-r] - w[N-r]f[N-r], \quad [24]$$

where the functions and variables are as defined above.

The third σ multiplier 80 multiplies the signal output from the fast transform circuit 70, which corresponds to the results of equation (20) (but for frame i+2) by $\sigma_2[r]$. $\sigma_2[r]$ represents a third combined window function that selectively combines the OLA synthesis window function $f[n]$ and the DFT analysis window function $w[n]$ of the window circuits 28 and 30, respectively, of FIG. 1 in accordance with the following equation:

$$\sigma_2[r] = w[-r]f\left[-r - \frac{N}{2}\right] - w[N-r]f\left[\frac{N}{2} - r\right], \quad [25]$$

where the functions and variables are as defined above.

The adder 82 adds the signals output by the σ multipliers 74, 78, and 80, to yield a sum (T[r]) in accordance with the following equation:

$$T[r] = \sigma_0[r]\bar{\bar{g}}_i[r] + \sigma_1[r]\bar{g}_{i+1}[r] + \sigma_2[r]g_{i+2}[r] \quad [26]$$

where the functions and variables are as described above for equation (19).

The IDFT circuit 84 computes the IDFT of the sum T[r] given in equation (26) in accordance with equation (19). The output $\chi_N[i+1,l]$ of the IDFT circuit 84 is the DFT-domain signal representation of the input MDCT-domain signal $X_N[i+1,k]$. Hence, the MDCT-to-DFT converter 52 converts input MDCT signals directly from the MDCT domain to the DFT domain without intermediate conversion to the time domain.

When the fast transform circuit 70 computes $g_i[r]$ for frame i+2, i.e., computes $g_{i+2}[r]$, the first delay and update circuit computes $\bar{g}_i[r]$ for frame i+1 ($\bar{g}_{i+1}[r]$), and the second delay and update circuit 76 computes $\bar{\bar{g}}_i[r]$ for frame i ($\bar{\bar{g}}_i[r]$). Alternatively, the delay and update circuits 72 and 76 may previously (before $g_{i+2}[r]$ is computed by the fast transform circuit 70) compute $\bar{g}_{i+1}[r]$ and $\bar{\bar{g}}_i[r]$, respectively, and then maintain the results in memory (not shown) until the results including $g_{i+2}[r]$ are simultaneously clocked into the σ multipliers 74, 78, and 80 and then clocked into the adder 82 via timing circuitry (not shown). Alternatively, the adder 82 may include memory for collecting and adding $\sigma_2[r]g_{i+2}[r]$, $\sigma_1[r]\bar{g}_{i+1}[r]$, and $\sigma_0[r]\bar{\bar{g}}_i[r]$. With access to the present teachings, one skilled in the art may easily implement timing circuitry and/or memory (not shown) required to ensure that $g_{i+2}[r]$, $\bar{g}_{i+1}[r]$, and $\bar{\bar{g}}_i[r]$ for frames i+2, i+1, and i, respectively, are multiplied by the σ multipliers 74, 78, and 80, respectively, and added by the adder 82 in accordance with equation (19).

At each iteration, two of the transform functions ($g_{i+2}[r]$, $\bar{g}_{i+1}[r]$,$\bar{\bar{g}}_i[r]$) in equation (26), namely $\bar{\bar{g}}_i[r]$ and $\bar{g}_{i+1}[r]$, are obtained via an update formulation. The update formulation includes a data shift and a sign change for half of the data. The only new computations required are for $g_{i+2}[r]$ and the multiplications implemented via the σ multipliers 74, 78, and 80. $g_{i+2}[r]$ is computed in accordance with equation (20) for frame i+2 via a corresponding fast algorithm, as discussed more fully below. The number of multiplications implemented by the σ multipliers 74, 78, and 80 is 2N, since $\sigma_0[r]$ and $\sigma_2[r]$ each has only $$\frac{N}{2}$$

nonzero values. The σ[r] multipliers and g[r] transform functions are all real-valued.

The fast transform circuit 70 employs a fast algorithm to compute equation (20). The fast algorithm exploits symmetries of $g_i[r]$ of equation (20) and the fact that $g_i[r]$ is always real to minimize computational complexity.

Since $g_i[r]$ is always real, $g_i[r]$ maybe written as:

$$g_i[r] = 2\sum_{k=0}^{\frac{N}{2}-1} X_N[i,k](-1)^{k+1}\sin\left[\frac{2\pi}{N}(r-n_0)\left(k+\frac{1}{2}\right)\right], \quad [27]$$

where r is the transform index and is an integer such that $0 \leq r \leq N-1$; and the remaining terms are as defined above.

The first transform signal $g_i[r]$ exhibits symmetry such that the odd samples may be derived from the even samples. The odd samples are denoted as follows:

$$\dot{B}_i[r] = g_i[2r+1], \quad 0 \leq r \leq \frac{N}{2} - 1, \quad [28]$$

where $\dot{B}_i[r]$ represents the odd samples of $g_i[r]$. Note that when r=0, then $\dot{B}_i[r] = \dot{B}_i[0] = g_i[2\cdot 0 + 1] = g_i[1]$, which is the first odd sample. Similarly, when $$r = \frac{N}{2} - 1,$$

then $$\dot{B}_i[r] = \dot{B}_i\left[\frac{N}{2} - 1\right] = g_i\left[2\cdot\left(\frac{N}{2} - 1\right) + 1\right] = g_i[N-1],$$

which is the last odd sample, assuming N is chosen to be even.

The even samples are denoted as follows:

$$\dot{A}_i[r] = g_i[2r], \quad 0 \leq r \leq \frac{N}{2} - 1, \quad [29]$$

where $\dot{A}_i[r]$ represents the even samples. Note that when r=0, then $\dot{A}_i[r] = \dot{A}_i[0] = g_i[2\cdot 0] = g_i[0]$, which is the first even sample. Similarly, when $$r = \frac{N}{2} - 1,$$

then $$\dot{A}_i[r] = \dot{A}_i\left[\frac{N}{2} - 1\right] = g_i\left[2\cdot\left(\frac{N}{2} - 1\right)\right] = g_i[N-2],$$

which is the last even sample, assuming N is even.

The odd samples described in equation (28) may be computed from the even samples in equation (29) via the following equations:

$$\dot{B}_i[r] = \begin{cases} -\dot{A}_i\left[\frac{N}{4} - r\right] & 0 \leq r \leq \frac{N}{4} \\ \dot{A}_i\left[\frac{3N}{4} - r\right] & \frac{N}{4} + 1 \leq r \leq \frac{N}{2} - 1 \end{cases} \quad [30]$$

where $$\dot{A}_i\left[\frac{N}{4} - r\right], \quad 0 \leq r \leq \frac{N}{4}$$

are the even samples of $g_i[r]$ for the first half of the $i^{th}$ frame, and $$\dot{A}_i\left[\frac{3N}{4}-r\right], \quad \frac{N}{4}+1 \le r \le \frac{N}{2}-1$$

are the even samples of $g_i[r]$ for the second half of the $i^{th}$ frame.

The fast transform circuit 70 circuit determines the even samples $\dot{A}_i[r]$ of $g_i[r]$ via a fast algorithm and then determines the odd samples via equation (30). The fast algorithm employed by the fast transform circuit 70 to determine the even samples is derived from $g_i[r]$ as given by equation (27) by noting that the even samples $\dot{A}_i[r]$ may be expressed as follows:

$$\dot{A}_i[r] = -2\sum_{k=0}^{\frac{N}{2}-1}\left[X_N[i,2k]\sin\left(\frac{\pi}{2N}(4r-2n_0)(4k+1)\right) - X_N\left[i,\frac{N}{2}-2k-1\right]\cos\left(\frac{\pi}{2N}(4r-2n_0)(4k+1)\right)\right], \quad [31]$$

where the terms are as defined above.

The even samples $\dot{A}_i[r]$ as given in equation (31) for the first half of the $i^{th}$ frame of $g_1[r]$ may be separated into the even samples $$\left(\dot{A}_i[r], 0 \le r \le \frac{N}{4}-1\right)$$

for the first half of the $i^{th}$ frame and the even samples for the second half $$\left(\dot{A}_i\left[r+\frac{N}{4}\right], 0 \le r \le \frac{N}{4}-1\right)$$

of the $i^{th}$ frame as given by the following equations:

$$\dot{A}_i[r] = \sum_{k=0}^{\frac{N}{4}-1}\sqrt{2}(-1)^{k+1}\{X_N[i,2k](\sin\beta_{k,r}-\cos\beta_{k,r}) + X_N\left[i,\frac{N}{2}-2k-1\right](\sin\beta_{k,r}+\cos\beta_{k,r})\}, \quad [32]$$

$$\dot{A}_i\left[r+\frac{N}{4}\right] = \sum_{k=0}^{\frac{N}{4}-1}\sqrt{2}(-1)^{k+1}\{X_N[i,2k](\sin\beta_{k,r}+\cos\beta_{k,r}) + X_N\left[i,\frac{N}{2}-2k-1\right](\cos\beta_{k,r}-\sin\beta_{k,r})\}, \quad [33]$$

where r and k are transform indices as defined above;

$$0 \le r \le \frac{N}{4}-1;$$

$$\beta_{k,r} = \frac{\pi}{2N}(4r-1)(4k+1); \dot{A}_i[r]$$

in equation (32) represents the even samples of $g_i[r]$ for the first half of the $i^{th}$ frame; and $$\dot{A}_i\left[r+\frac{N}{4}\right]$$

in equation (33) represents the even samples for the second half of the $i^{th}$ frame.

Equations (32) and (33) may be written as one complex function, which may be computed via a quarter point IDFT as given by the following equation:

$$\dot{A}_i\left[r+\frac{N}{4}\right] + j\dot{A}_i[r] = \quad [34]$$

$$\frac{N}{2}e^{j\frac{\pi}{N}(2r-n_0)}F_{\frac{N}{4}}^{-1}\left\{(-1)^{k+1}e^{-j\frac{2\pi k}{N}}\left(X_N[i,k]+jX_N\left[i,\frac{N}{2}-2k-1\right]\right)\right\},$$

where $$F_{\frac{N}{4}}^{-1}\{\ \}$$

is a quarter point complex inverse DFT function;

$$0 \le k \le \frac{N}{4}-1$$

and $$0 \le r \le \frac{N}{4}-1;$$

and the remaining functions and variables are as defined above. The N/4-point IDFT, $$F_{\frac{N}{4}}^{-1}\{\ \},$$

has an input with both real and imaginary components and an output with both real and imaginary components.

Equation (34) represents a fast algorithm for computing the even samples for an $i^{th}$ frame of $g_i[r]$ given by equation (27). The fast transform circuit 70 computes the fast algorithm of equation (34) to determine the even samples, and then efficiently determines the corresponding odd samples via equation (30).

With access to the present teachings, one skilled in the art may develop circuits or software required to implement the fast transform circuit 70, the delay and update circuits 72 and 76, the σ multipliers 74, 78, and 80, the adder 82, and the inverse DFT 84 without undue experimentation. Those skilled in the art will appreciate that fast algorithms other than the algorithm of equation (34) may be employed for the purposes of the present invention without departing from the scope thereof.

Figure 5:
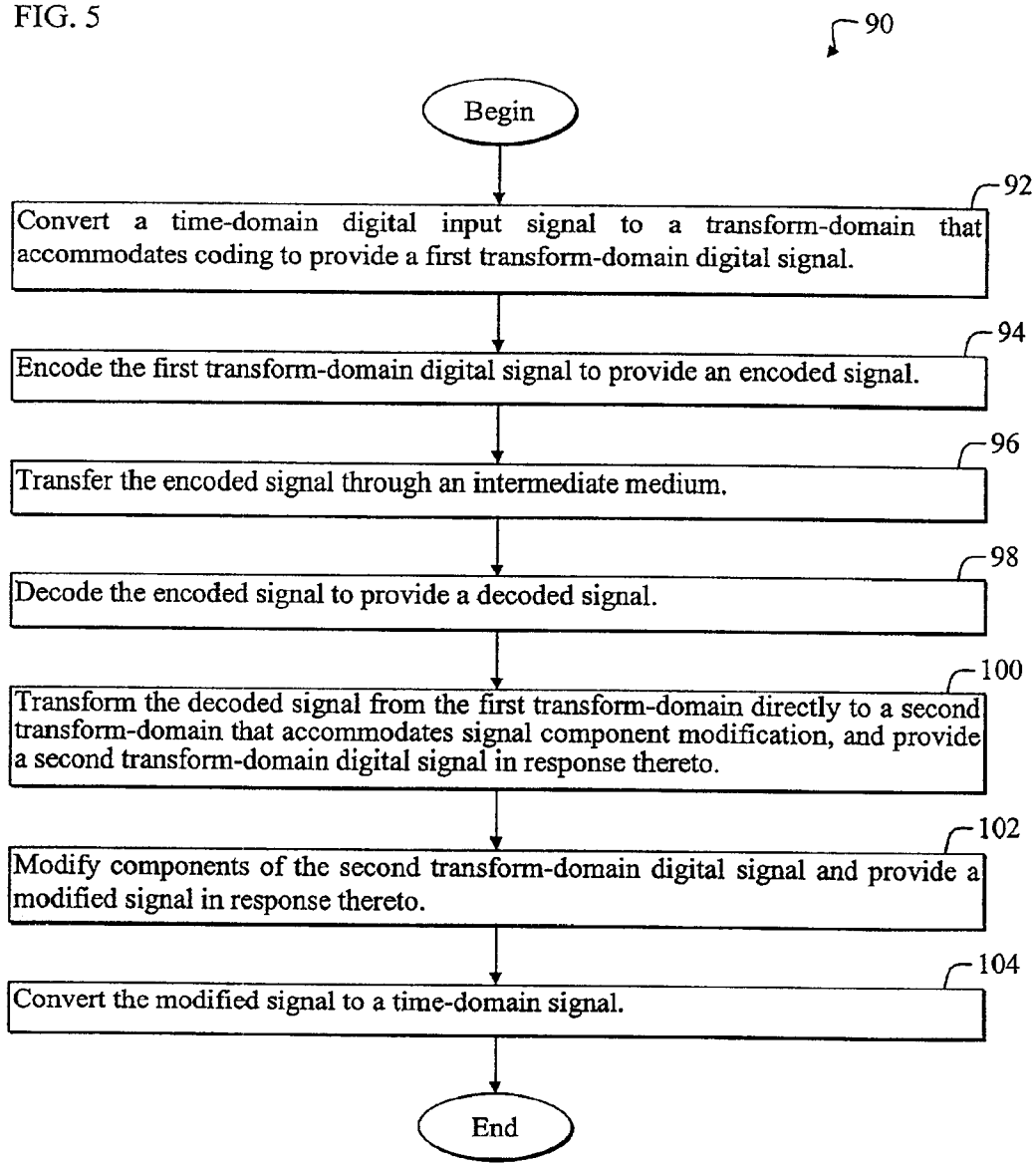
FIG. 5 is a flow diagram of a method for facilitating compression-domain signal modification implemented by the digital audio system of FIG. 2.

FIG. 5 is a flow diagram of a method 90 for facilitating compression-domain signal component modification implemented by the digital audio system of FIG. 2. In an initial domain-conversion step 92, a time-domain signal is converted to a coding domain (also called a compression domain) that facilitates coding to yield a first transform-domain signal. An exemplary coding domain is the MDCT domain.

Subsequently, the first transform-domain signal is encoded in an encoding step 94. The encoding may be implemented via a standard quantization and entropy coding algorithm or other encoding algorithm. Subsequently, control is passed to a signal-transfer step 96.

In the signal-transfer step 96, the encoded signal is transferred through an intermediate medium, such as a hard drive, Random Access Memory (RAM), a network link, a wireless channel, or other medium. After the encoded signal has been transferred through the intermediate medium, the encoded signal is decoded in a decoding step 98. Signal decoding typically involves performing an inverse of the encoding process. Subsequently, control is passed to a transform-domain conversion step 100.

In the transform-domain conversion step 100, the decoded signal is converted from the coding domain to a modification domain, such as the DFT domain, to yield a modification-domain signal. The transform-domain conversion does not require intermediate time-domain conversion.

The modification-domain signal is then selectively modified in a modification step 102. The exact modifications performed by the modification step 102 are application-specific, but may include modifications such as time-scaling and pitch-shifting. The resulting modified signal is then converted back to a time-domain signal in a final domain-conversion step 104.

Figure 6:
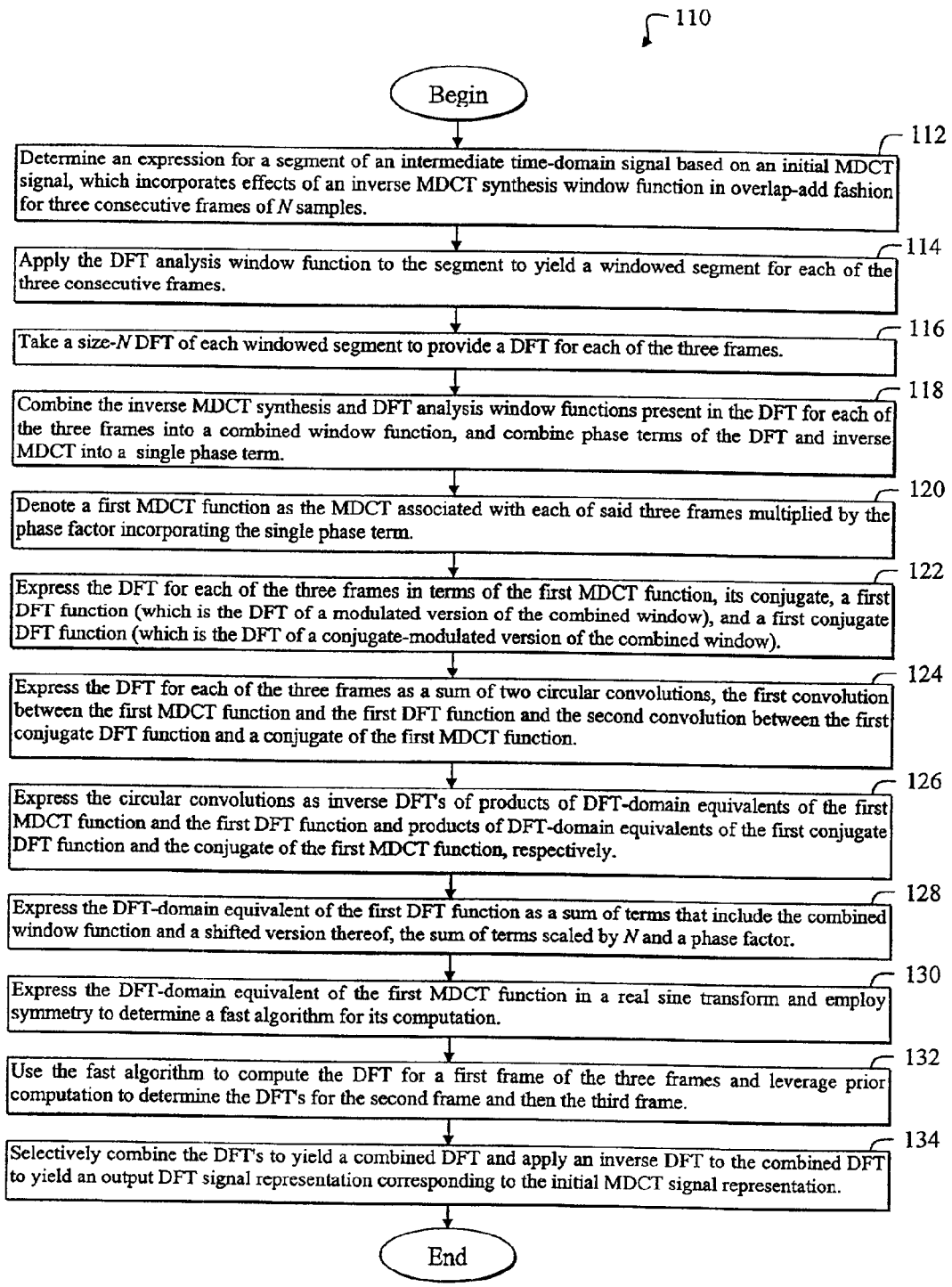
FIG. 6 is a flow diagram of a method for converting directly from a first transform domain to a second transform domain employed by the MDCT-to-DFT converter of FIG. 4 and the method of FIG. 5.

FIG. 6 is a flow diagram of a method 110 for converting directly from a first transform domain to a second transform domain employed by the MDCT-to-DFT converter of FIG. 4 and the method of FIG. 5. In the method 110 of FIG. 6, the first transform domain is the MDCT domain, while the second transform domain is the DFT domain. Those skilled in the art will appreciate that other transform domains may be employed in the method 110 instead of the MDCT domain and the DFT domain without departing from the scope of the present invention. Those skilled in the art with access to the present teachings will know how to modify the method 110 as needed to accommodate different transform domains.

In an initial time-domain expression step 112, an expression for an intermediate time-domain signal is developed. The time-domain expression is based on an initial MDCT signal representation and incorporates the effects of the MDCT synthesis window function $f[n]$. The time-domain expression applies to three consecutive frames. However, the present invention is not limited to the use of three frames for the time-domain expression. The time-domain expression is given below, where the equation is phrased in terms of frame i+1 to simplify notation:

$$\tilde{x}_{i+1}[n] = f\left[n + \frac{N}{2}\right]\hat{x}_i\left[n + \frac{N}{2}\right] + f[n]\hat{x}_{i+1}[n] + f\left[n - \frac{N}{2}\right]\hat{x}_{i+2}\left[n - \frac{N}{2}\right], \quad [35]$$

where $0 \le n \le N-1$, and the functions of equation (35) are zero by definition outside the interval $0 \le n \le N-1$, $\hat{x}_i[n] = \hat{x}[n+iL]$ is a length-N block of the reconstructed time-domain signal for the $i^{th}$ frame, where L is the OLA stride, which is $$\frac{N}{2}$$

in equation (35); $\hat{x}_i[n]$ is an expression for the output of the inverse MDCT circuit 26 of FIG. 1, which includes the effects of the MDCT analysis window $h[n]$; and $f[n]$ is the MDCT OLA synthesis window function as implemented via the MDCT OLA synthesis window circuit 28 of FIG. 1.

For an OLA stride of $$\frac{N}{2},$$

each length-N segment of the reconstructed time-domain signal as given in equation (35) is the sum of three adjacent frames (see FIG. 3). The reconstructed time-domain signal of equation (35) may be expressed by the following summation:

$$\tilde{x}_{i+1}[n] = \sum_{a=0}^{2} f[n + T_a]\hat{x}_{i+a}[n + T_a], \quad [36]$$

where $$0 \le n \le N-1; T_0 = \frac{N}{2}, T_1 = 0; \text{ and } T_2 = -\frac{N}{2}.$$

After expressing a segment of the intermediate reconstructed time-domain signal via equation (36), control is passed to a window-application step 114. In the window-application step 114, the DFT analysis window $w[n]$ is applied to the time-domain signal to yield a windowed segment $w[n]\tilde{x}_{i+1}[n]$ expressed as the sum of three windowed frames, which include frame i, frame i+1, and frame i+2. The windowed segments are given by the following equation:

$$w[n]\tilde{x}_{i+1}[n] = \sum_{a=0}^{2} w[n]f[n + T_a]\hat{x}_{i+a}[n + T_a]. \quad [37]$$

Subsequently, control is passed to a DFT-step 116, where a size-N DFT is applied to both sides of equation (37) to yield the following expression:

$$\chi_N[i+1, l] = \sum_{a=0}^{2} \Psi[i, a, l], \quad [38]$$

where the DFT $\chi_N[i+1,l]$ is the DFT for frame i+1; l is the DFT frequency index; and $\Psi[i,a,l]$ is the DFT for the $a^{th}$ term in the sum of equation (38). $\Psi[i,a,l]$ is given by the following equation:

$$\Psi_N[i, a, l] = \sum_{n=0}^{N-1} w[n]f[n + T_a]\hat{x}_{i+a}[n + T_a]e^{-j\frac{2\pi n l}{N}}. \quad [39]$$

Subsequently, control is passed to a window-combining step 118, where the MDCT synthesis window function $f[n]$ and the DFT analysis window function $w[n]$ are expressed as the following combined window function $p_a[n]$:

$$p_a[n] = w[n]f[n+T_a]. \quad [40]$$

Phase terms of the DFT of equation (39) are combined to yield the following phase term $\theta_a[k]$:

$$\theta_a[k] = \frac{2\pi}{N}(n_0 + T_a)\left(k + \frac{1}{2}\right), \quad [41]$$

where the variables are as defined above for equation (8).

Equation (39) may be rewritten by incorporating the combined window function $p_a[n]$ of equation (40) and the phase term $\theta_a[k]$ of equation (41) as given in the following equation:

$$\Psi_N[i, a, l] = \frac{1}{2N} \sum_{k=0}^{N-1} \left( X_N[i+a, k]e^{j\theta_a[k]} \sum_{n=0}^{N-1} p_a[n]e^{-j\frac{2\pi n}{N}(l-k-\frac{1}{2})} + X_N[i+a, k]e^{-j\theta_a[k]} \sum_{n=0}^{N-1} p_a[n]e^{-j\frac{2\pi n}{N}(l+k+\frac{1}{2})} \right), \quad [42]$$

where $X_N[i+a,k]$ represents the MDCT signal associated with frame i+a.

Subsequently, control is passed to an MDCT function step 120 where a first MDCT function and a conjugate of the first MDCT function are given by the following equations, respectively:

$$S_{i,a}[k] = X_N[i+a,k]e^{j\theta_a[k]} \text{ and} \quad [43]$$

$$S^*_{i,a}[k] = X_N[i+a,k]e^{-j\theta_a[k]}, \quad [44]$$

where k is a transform index; and $X_N[i+a,k]$ is the N-point MDCT for frame i+a.

$X_N[i+a,k]$ is always real-valued. Consequently, the DFT $\Psi[i,a,l]$ of equation (42) may be written as:

$$\Psi_N[i, a, l] = \frac{1}{2N} \sum_{k=0}^{N-1} S_{i,a}[k]P_a[l-k] + S^*_{i,a}[k]P'_a[l+k]. \quad [45]$$

Subsequently, control is passed to a DFT-function step 122. In the DFT-function step 122, a DFT is applied to $$p_a[n]e^{j\frac{\pi n}{N}} \text{ and to } p_a[n]e^{-j\frac{\pi n}{N}},$$

which represent the window function $p_a[n]$ of equation (40) multiplied by the phase factors $$e^{j\frac{\pi n}{N}} \text{ and } e^{-j\frac{\pi n}{N}},$$

respectively. The application of the DFT yields the following first and second DFT functions, respectively:

$$P_a[k] = F_N\{p_a[n]e^{j\frac{\pi n}{N}}\}, \quad [46]$$

$$P'_a[k] = F_N\{p_a[n]e^{-j\frac{\pi n}{N}}\}. \quad [47]$$

The summations over n of equation (45) may be expressed in terms of the first and second DFT functions of equations (46) and (47) as discussed more fully below. Subsequently, control is passed to a circular-convolution step 124, where the DFT $\Psi[i,a,l]$ of equation (45) is expressed as a sum of circular convolutions in accordance with the following equation:

$$\Psi_N[i, a, l] = \frac{1}{2N}(Q_{i,a}[l] + R_{i,a}[-l]), \quad [48]$$

where $Q_{i,a}[l]$ and $R_{i,a}[l]$ are defined by the following equations, respectively:

$$Q_{i,a}[l] = S_{i,a}[l] \otimes P_a[l] \text{ and} \quad [49]$$

$$R_{i,a}[l] = S^*_{i,a}[l] \otimes P'_a[-l] = S^*_{i,a}[k] \otimes P'_a[l] \quad [50]$$

where $P'_a[-l] = P^*_a[l]$ due to the conjugation properties of the DFT, and where the symbol $\otimes$ denotes circular convolution.

Subsequently, control is passed to an IDFT step 126, where the circular convolutions of equations (49) and (50) are expressed in terms of IDFT's of products of DFT-domain representations of $S_{i,a}[l]$ (the first MDCT function) and $P_a[l]$ (the first DFT function) and in terms of IDFT's of products of DFT-domain representations $S^*_{i,a}[l]$ and $P^*_a[l]$, respectively. The terms $Q_{i,a}[l]$ and $R_{i,a}[l]$ of equations (49) and (50) are given by the following equations:

$$Q_{i,a}[l] = F_N^{-1}\{F_N\{S_{i,a}[l]\}F_N\{P_a[l]\}\}, \quad [51]$$

$$R_{i,a}[-l] = F_N^{-1}\{F_N\{S^*_{i,a}[-l]\}F_N\{P^*_a[-l]\}\}. \quad [52]$$

Subsequently, control is passed to a simplification step 128. In the simplification step 128, the DFT-domain equivalent of the first DFT function ($F_N\{P_a[l]\}$) is expressed as a sum of terms that include the combined window function $p_a[-r]$ and a shifted version $p_a[N-r]$ thereof (see equation (40)). The sum is scaled by N and the phase factor $$e^{-j\frac{\pi r}{N}}$$

as given in the following equation:

$$F_N\{P_a[l]\} = Ne^{-j\frac{\pi r}{N}}(p_a[-r] - p_a[N-r]). \quad [53]$$

The factor N of equation (53) will cancel when substituted into equation (48).

Similarly, in the simplification step 128, the DFT of the conjugate DFT function ($F_N\{P^*_a[l]\}$) is given by the following equation:

$$F_N\{P^*_a[-l]\} = N\rho^*_a[r], \quad [54]$$

where $$\rho_a[r] = e^{-j\frac{\pi r}{N}}\sigma_a[r]; \rho^*_a[r] = e^{j\frac{2\pi r}{N}}\rho_a[r]; \text{ and}$$

$$\sigma_a[r] = p_a[-r] - p_a[N-r];$$

and the functions $p_a[r]$, $\sigma_a[r]$, and $\rho_a[r]$ are supported on the interval $r \in [0, N-1]$; are zero everywhere outside this interval; but may be zero for certain values of r within this interval.

Subsequently, control is passed to a symmetry step 130, wherein the DFT-domain equivalent of the first MDCT function ($F_N\{S_{i,a}[k]\}$) is employed in a real sine transform ($g_i[r]$) as expressed in equations (20) and (27) (See equation (45), and note that $F_N\{S_{i,a}[k]\} = F_N\{X_N[i+a,k]e^{j\theta_a[k]}\}$.). The symmetry of the real sine transform is employed to determine a fast algorithm for its computation (see equations (34) and (30)).

In accordance with step 130, employing equations (51) through (54), equation (48) may be rewritten as:

$$\Psi_N[i, a, l] = \frac{1}{2}F_N^{-1}\{\rho_a[r](F_N\{S_{i,a}[k]\} + e^{j\frac{2\pi r}{N}}F_N\{S^*_{i,a}[-k]\})\}. \quad [56]$$

Using the shift property of the DFT, equation (56) becomes:

$$\Psi_N[i,a,l] = \frac{1}{2}F_N^{-1}\{\rho_a[r]F_N\{S_{i,a}[k] + S_{i,a}^*[N-k-1]\}\}. \quad [57]$$

For even N, $S^*_{i,a}[N-K-1]=S_{i,a}[k]$, so the resulting factor of 2 cancels the ½ in equation (57), resulting in the formulation:

$$\Psi_N[i,a,l]=F_N^{-1}\{\rho_a[r]F_N\{X_N[i+a,k]e^{j\Theta_a[k]}\}\}, \quad [58]$$

where $F_N\{X_N[i+a,k]e^{j\Theta_a[k]}\}=F_N\{S_{i,a}[k]\}$.

Equation (58) is a general expression for the three summed terms $\Psi[i,a,l]$ in equation (38). The phase factors of equation (41) and (42) are as follows for a=0, 1, 2 respectively:

$$e^{j\Theta_0[k]}=j(-1)^k e^{j\phi_k}, \quad [59]$$

$$e^{j\Theta_1[k]}=e^{j\phi_k}, \quad [60]$$

$$e^{j\Theta_2[k]}=-j(-1)^k e^{j\phi_k}, \quad [61]$$

where $\phi_k = \frac{2\pi n_0}{N}\left(k+\frac{1}{2}\right)$.

Combining (58) through (61) into equation (38) yields the following expression, which is facilitates direct conversion from the MDCT domain to the DFT domain:

$$\chi_N[i+1,l] = F_N^{-1}\{\rho_0[r]F_N\{X_N[i,k]e^{j\phi_k}(-1)^k(j)\} + \quad [62]$$
$$\rho_1[r]F_N\{X_N[i+1,k]e^{j\phi_k}\} +$$
$$\rho_2[r]F_N\{X_N[i+2,k]e^{j\phi_k}(-1)^k(-j)\}\}$$
$$= F_N^{-1}\{\sigma_0[r]\bar{g}_i[r] + \sigma_1[r]\bar{g}_{i+1}[r] + \sigma_2[r]g_{i+2}[r]\}$$
$$= F_N^{-1}\{T[r]\}.$$

The development of equation (62) has been phrased in terms of frame i+1 to simplify the notation. Note that equation (62) employs equations (19) and (26), and that the terms within the inverse DFT $F_N^{-1}\{\ \}$ in equation (62) are equivalent to the terms T[r] within the inverse DFT $F_N^{-1}\{\ \}$ in equation (19).

Subsequently, control is passed to a fast algorithm step 132, where a fast algorithm is employed to compute the components of T[r] in equation (62). Specifically, a fast algorithm computes the expression $g_i[r]$ in equation (20), but for frame i+2, via the fast transform circuit 70 of FIG. 4. The function $g_i[r]$ corresponds to one of the components ($g_{i+2}[r]$) inside the inverse DFT of equation (62). The remaining components in equation (62) are computed by the delay and update routine as implemented via the delay and update circuits 72 and 76 of FIG. 4.

Subsequently, control is passed to a final IDFT step 134, wherein the DFT signal expressed by equation (62) is computed. Specifically, T[r] is computed from components calculated in the previous fast algorithm step 132. Then an IDFT is applied to T[r] in accordance with equation (62).

The fast algorithm for computing the DFT signal expressed by equation (62) is as described for the MDCT-to-DFT converter 52 of FIG. 4. Implementation of the fast algorithm is facilitated by the sequential nature of the expression of equation (62). Namely, when frame i+2 is being processed (namely, when $g_{i+2}[r]$ is being computed), frames i+1 and i have already been processed (namely, $g_{i+1}[r]$ and $g_i[r]$ have already been computed), one and two frames earlier, respectively. This prior computation is leveraged to provide the output DFT signal for frame i+1. Consequently, in a local sense and for a single frame, two-thirds of the processing required to determine the DFT-domain representation for each frame is eliminated. The leveraging of prior fast algorithm computation is illustrated by the delay and update circuits 72 and 76 of FIG. 4. The delay and update circuits 72 and 76 act as memory elements to store and update values associated with prior computations. Leveraging of prior fast algorithm computations is a unique aspect of the present invention that facilitates efficient conversion between the MDCT and DFT domains.

A more general method for converting between a first transform domain and a second transform domain includes the following steps:

1. Determine an expression for a segment of an intermediate time-domain signal based on a first transform-domain signal expression. The expression for the segment should incorporate a second transform-domain analysis window and a first transform-domain synthesis window.

2. Apply a second transform associated with the second transform domain to the expression of the segment to yield a second transform-domain expression.

3. Compute a first transform-domain function and a second transform-domain function from the second transform-domain expression.

4. Express a second transform-domain signal in terms that may include a convolution of the first transform-domain function with the second transform-domain function and/or corresponding conjugate functions.

5. Perform an inverse second transform of the product between the second transform of the first transform-domain function and the second transform of the second transform-domain function and/or the product between corresponding conjugate functions to yield a second transform-domain representation.

6. Employ a fast algorithm based on the second transform-domain representation and symmetry thereof to compute a second transform-domain signal corresponding to the first transform-domain signal.

Figure 7:
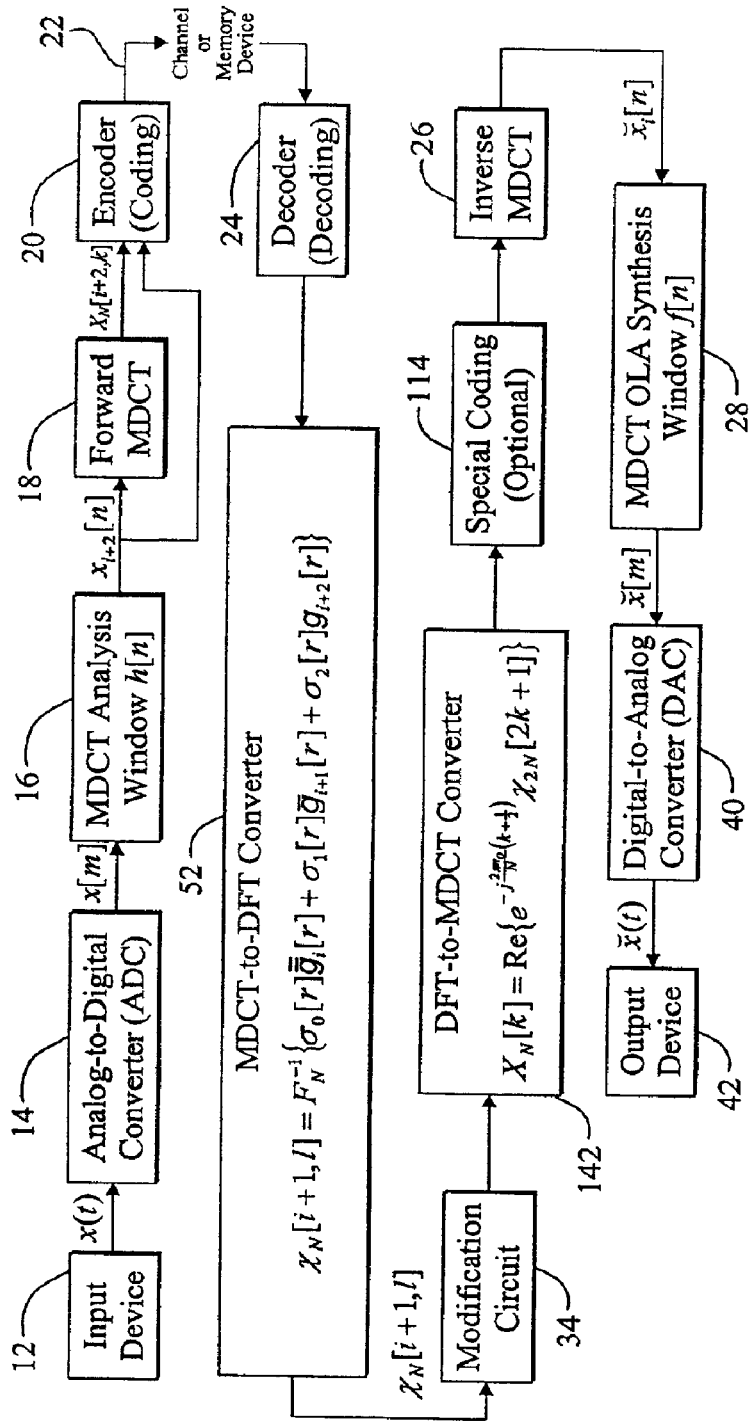
FIG. 7 is a diagram of a digital audio system employing the MDCT-to-DFT converter of FIG. 4 and a DFT-to-MDCT converter constructed in accordance with the teachings of the present invention.

FIG. 7 is a diagram of a digital audio system 140 employing the MDCT-to-DFT converter 52 of FIG. 4 and a DFT-to-MDCT converter 142 constructed in accordance with the teachings of the present invention. The digital audio system 140 is similar to the digital audio system 50 of FIG. 2 with the exception that the system 140 has different processes following the modification circuit 34; the digital audio system 140 includes the DFT-to-MDCT converter 142, a special coding circuit 114, the inverse MDCT circuit 26, the MDCT OLA synthesis window circuit 28, the DAC 40, and the output device 42. In the digital audio system 140 of FIG. 7, signal reconstruction is performed via the inverse MDCT circuit 26 and MDCT OLA synthesis window circuit 28 rather than the inverse DFT circuit 36 and DFT OLA synthesis window circuit 38 of FIG. 2. Furthermore, DFT-domain signal modifications might be performed remotely via the modification block 34. In this scenario, the DFT signal is converted to the MDCT domain by the DFT-to-MDCT converter 142, and the MDCT signal is coded, transmitted, and decoded (all in the special coding circuit 114, which may include a transmission channel or storage medium). Reconstruction would then be achieved as described above. The special coding circuit 114 may be omitted without departing from the scope of the present invention.

An output of the modification circuit 34 is connected to an input of the DFT-to-MDCT converter 142. An output of the DFT-to-MDCT converter 142 is input to the special coding circuit 114. An output of the special coding circuit 114 is input to the inverse MDCT circuit 26. An output of the inverse MDCT circuit 26 is input to the MDCT OLA synthesis window circuit 28. An output of the MDCT OLA synthesis window circuit 28 is input to the DAC 40, which provides an analog signal to the output device 42.

In the system 140, time-domain aliasing is removed by the mapping to the DFT domain via the MDCT-to-DFT converter 52 and reintroduced by the mapping back to the MDCT domain via the DFT-to-MDCT converter 142. This reintroduced aliasing is cancelled in the OLA synthesis window circuit 28 (via the synthesis window function $f[n]$). The analysis and synthesis window functions implemented by the MDCT-to-DFT converter 52 and the OLA synthesis window circuit 28, respectively, satisfy the MDCT perfect reconstruction conditions (see equations (2) through (6)). Note that the synthesis window function $f[n]$ is explicitly shown as a processing block 28, and that the relevant analysis window function (w[n]) is implemented in the MDCT-to-DFT converter 52.

In the present embodiment, the encoder 20 implements a signal compression algorithm to compress the MDCT signal ($X_N[i+2,k]$) output from the forward MDCT circuit 18. The resulting signal is called a compression-domain signal. Rather than directly modifying the compression-domain signal at the output of the encoder 20 or at the output of the MDCT circuit 18, the compression-domain signal is decoded via the decoder 24 and then converted to a suitable modification domain, which is the DFT domain in the present embodiment. Conversion of a signal from the compression domain (the MDCT domain) to the modification domain (DFT domain) is implemented directly by the MDCT-to-DFT converter 52.

After the MDCT-to-DFT converter 52 converts an input MDCT signal to the DFT domain, the modification circuit 34 selectively modifies signal components of the resulting DFT signal. After signal component modification, the modified signal may be converted back to the time domain via an overlap-add process as done in the audio system 50 of FIG. 2. Alternatively, as done in the audio system 140 of FIG. 7, the modified DFT signal output by the modification circuit 34 may be converted back to the MDCT domain, where coding may again be performed if desired (for efficient storage or transmission of the modified signal). Additional coding is often desirable if a channel or memory (now shown) exists after the DFT-to-MDCT converter 52.

The DFT signal is converted back to an MDCT signal via the direct DFT-to-MDCT converter 142. The additional coding is implemented by the special coding circuit 114. The special coding circuit 114 may be omitted without departing from the scope of the present invention.

The DFT-to-MDCT converter 142 converts directly from the DFT domain to the MDCT domain in accordance with the following equation:

$$X[k] = \text{Re}\left\{e^{-j\frac{2\pi n_0}{N}(k+1)} F_N\{x[n]e^{-j\pi\frac{n}{N}}\}\right\}, \quad [63]$$

where $F_N\{\ \}$ is an N-point DFT function, and $$F_N\{x[n]e^{-j\frac{\pi n}{N}}\}$$

is given by the following equation:

$$F_N\{x[n]e^{-j\frac{\pi n}{N}}\} = F_{2N}\{x[n]e^{-j\frac{2\pi n}{2N}}\} \quad [64]$$
$$= X_{2N}[2k+1]$$
$$= X'_N[k],$$

where $X_{2N}[k]$, $0 \leq k \leq 2N-1$ is a twice-oversampled even DFT; and $X'_N[k]$, $0 \leq k \leq N-1$ is an N-point odd DFT, which is given by the following equation:

$$X'_N[k] = F'_N\{x[n]\} = \sum_{k=0}^{N-1} x[n]e^{-j\frac{2\pi n}{2N}(k+\frac{1}{2})} \quad [65]$$

A size-N (N-point) MDCT $X_N[k]$ may be expressed in terms of a size-2N even DFT or a size-N odd DFT in accordance with the following equation:

$$X_N[k] = \text{Re}\left\{e^{-j\frac{2\pi n_0}{2N}(k+\frac{1}{2})} X_{2N}[2k+1]\right\} \quad [66]$$
$$= \text{Re}\left\{e^{-j\frac{2\pi n_0}{N}(k+\frac{1}{2})} X'_N[k]\right\}$$

where $\text{Re}\{z\}$ gives the real part of the complex number z.

Equation (66) above is employed by the DFT-to-MDCT converter 142 to convert a DFT input signal to an MDCT output signal, which is input to the special coding circuit 114 or directly to the inverse MDCT circuit 26. Note that equation (66) is generally not employed directly, since the input DFT from the MDCT-to-DFT converter 52 is a size-N even DFT; direct use of equation (66) would require deriving a size-2N even DFT or a size-N odd DFT in the MDCT-to-DFT converter 52. However, both of these options are simple extensions of the DFT-to-MDCT converter 52 presented here, and may be implemented by one skilled in the art with access to the present teachings without undue experimentation.

After additional coding via the special coding circuit 114 or directly after DFT-to-MDCT conversion via the DFT-to-MDCT converter 142, the resulting MDCT signal is converted back to the time domain via the inverse MDCT circuit 26 and MDCT OLA synthesis window circuit 28. The resulting digital time-domain signal is then converted to an analog signal via the DAC 40, which is input to the output device 42.

The various analysis and synthesis window functions h[n], f[n], w[n], v[n], employed by the MDCT analysis window circuit 16, the MDCT OLA synthesis window circuit 28, the DFT OLA analysis window circuit 38, respectively of FIG. 1 and selectively combined in FIGS. 2, 4, and 6, are chosen to satisfy certain reconstruction conditions suitable for a given application. Those skilled in the art will appreciate that different types of window functions that satisfy appropriate reconstruction conditions may be employed in the present invention without departing from the scope thereof.

The MDCT-to-DFT converter 52 of FIGS. 2 and 7 employs less memory than the corresponding circuits 26 through 32 of FIG. 1 and may require fewer and more cost-effective circuit components to implement. The MDCT-to-DFT converter 52 employs a mapping method to map directly from the MDCT to the DFT domains, while the circuits 26 through 32 of FIG. 1 employ a brute-force transform-domain conversion method requiring intermediate time-domain conversion. The number of multiplications and required memory for the brute-force and mapping methods are summarized in Table I:

TABLE I

| Method | Operation | Multiplications | Memory |
|---|---|---|---|
| Brute-Force | IMDCT | $2N + \frac{N}{4}\log\frac{N}{4}$ | $3N/2$ |
| | MDCT OLA Synthesis Window [n] | N | 2N |
| | DFT Analysis Window w[n] | N | N/2 |
| | DFT | $\frac{N}{2}\log\frac{N}{2}$ | N/2 |
| | Total | $3N + \frac{3N}{4}\log N$ | 9N/2 |
| Mapping | Fast Transform | $2N + \frac{N}{4}\log\frac{N}{4}$ | 3N/2 |
| | Product Terms | 2N | 2N |
| | IDFT | $\frac{N}{2}\log\frac{N}{2}$ | N/2 |
| | Total | $3N + \frac{3N}{4}\log N$ | 4N |

Hence, the memory savings obtained by using the MDCT-to-DFT converter 52 of FIG. 6 is on the order of N/2, which may be significant in some applications.

Table II, below, provides a specific source code embodiment that includes aspects of the present invention. The example source code converts a TDAC/MDCT representation to a DFT representation. Note that many other arrangements of instructions, different computer languages, processing systems, etc., can be used to achieve the present invention.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

TABLE II

```
do_dft_synth = 1;   %% 0: returns to tdac domain for synth
simplify = 0;   %% incorporates further simplifications
N = 8;
NN = 8*N;
n   = [0:1:NN-1]';
x = 0.75*square((n. ^ 0.97-0.3)/2);
x = x.*sin(pi*(n. ^ 1.1 + 0.5)/8);   % test signal
% parameters and necessary functions
k = [0:1:N-1]';
L = N/2;
n0 = (L+1)/2;
neg = (-1). ^ k;
ph  = exp(j*2*pi*n0*(k+0.5)/N);
phn = -j*neg.*ph;
phn_real = real(phn(1:L));
phn_imag = imag(phn(1:L));
h = sqrt(2)*sin((pi/N)*(k+0.5));
f = h;
mask = [-1*ones(L,1); ones(L,1)];
% windows
if do_dft_synth,
    w = triang(N);   % for dft synthesis
else
    w = h;   % for tdac synthesis
end;
% derive modified window functions for computation
wf0 = w.*[f([(L+1):N]); zeros(L,1)];
wf1 = w.*f;
wf2 = w.*[zeros(L,1); f([1:L])];
if simplify,
```

TABLE II-continued

```
        ph_mod    = ones(N,1);
else
        ph_mod    = exp(-j*pi*k/N);
end;
wf0_mod = zeros(N,1);
wf1_mod = zeros(N,1);
wf2_mod = zeros(N,1);
wf0_mod(1)     =  wf0(1);
wf0_mod(2:N)   = -wf0(N:-1:2);
wf0_mod        = ph_mod .* wf0_mod;
wf1_mod(1)     =  wf1(1);
wf1_mod(2:N)   = -wf1(N:-1:2);
wf1_mod        = ph_mod .* wf1_mod;
wf2_mod(1)     =  wf2(1);
wf2_mod(2:N)   = -wf2(N:-1:2);
wf2_mod        = ph_mod .* wf2_mod;
wf0_index = [1 [(L+2):N]];
wf2_index = [2:(L+1)];
wf_0_mod_real = real(wf0_mod(wf0_index));
wf_0_mod_imag = imag(wf0_mod(wf0_index));
wf_2_mod_real = real(wf2_mod(wf2_index));
wf_2_mod_imag = imag(wf2_mod(wf2_index));
wf_1_mod_real = real(wf1_mod);
wf_1_mod_imag = imag(wf1_mod);
% memory allocation
xr             = zeros(2*NN,1);
xr_dft         = zeros(2*NN,1);
Xm2            = zeros(N,1);
Xm2half        = zeros(L,1);
Xm2_dft        = zeros(N,1);
Xm0_dft_real   = zeros(N,1);
Xm1_dft_real   = zeros(N,1);
Xm2_dft_real   = zeros(N,1);
Xm0_dft_imag   = zeros(N,1);
Xm1_dft_imag   = zeros(N,1);
Xm2_dft_imag   = zeros(N,1);
Xdft_from_mdct   = zeros(N,1);     %% for dft synth
Xdft_from_mdct_2 = zeros(2*N,1);   %% for mdct synth
Xmdct_from_dft   = zeros(N,1);     %% mdct re-derived from dft
i = 0;                % time index
keep_going = 1;       % loop flag
if simplify,
        ph_mod    = exp(-j*pi*k/N);
end;
while keep_going,
        range   = [(i+1):(i+N)];
        xseg    = h.*x(range);
        Xm2     = mdctA(xseg);
        Xm2half = Xm2(1:L);    % mdct is odd-symmetric for N = 4c
        %% direct mdct synthesis and overlap-add
        xr_seg  = f.*imdctA([Xm2half; -flipud(Xm2half)]);
        xr(range) = xr(range) + xr_seg;
        i = i + L;
        if i+N > NN, keep_going = 0; end;
        % derive dft of original frame data using dft/idft
        Xm2half = Xm2half.*phn_real + j*(Xm2half.*phn_imag);
        Xm2_dft = fft([Xm2half; conj(flipud(Xm2half))],N);
        if simplify,
                Xm2_dft_real = ...
                        real(Xm2_dft).*real(ph_mod) - ...
                        imag(Xm2_dft).*imag(ph_mod);
        else
                Xm2_dft_real = real(Xm2_dft);
                Xm2_dft_imag = imag(Xm2_dft);
        end;
        temp = zeros(N,1);
        if simplify,
                temp(wf0_index) = ...
                        Xm0_dft_real(wf0_index).*wf0_mod_real;
                temp(wf2_index) = ...
                        Xm2_dft_real(wf2_index).*wf2_mod_real;
                temp = temp + ...
                        Xm1_dft_real.*wf1_mod_real;
        else
                temp(wf0_index) = ...
                        Xm0_dft_real(wf0_index).*wf0_mod_real - ...
                        Xm0_dft_imag(wf0_index).*wf0_mod_imag;
                temp(wf2_index) = ...
                        Xm2_dft_real(wf2_index).*wf2_mod_real - ...
```

TABLE II-continued

```
        Xm2_dft_imag(wf2_index).*wf2_mod_imag;
        temp = temp + ...
            Xm1_dft_real.*wf1_mod_real - ...
            Xm1_dft_imag.*wf1_mod_imag;
    end;
    Xdft_from_mdct = iffit(temp,N);   %% could be done in-place
    xr_dft_seg = real(iffit(Xdft_from_mdct,N));
    if do_dft_synth,
        xr_dft(range) = xr_dft(range) + xr_dft_seg;
    else
        %% for synthesis using mdct, need 2x oversampled dft.
        %% may be able to derive directly as above.
        Xdft_from_mdct_2 = fft(xr_dft_seg,2*N);
        Xmdct_from_dft = real(ph.*conj(Xdft_from_mdct_2((2*k+1)+1)));
        xr_dft_seg = f.*imdctA(Xmdct_from_dft);
        xr_dft(range) = xr_dft(range) + xr_dft_seg;
    end;
    % buffer advancement updates
    if simplify==0,
        Xm0_dft_real = -fftshift(Xm1_dft_imag);
        Xm0_dft_imag =  fftshift(Xm1_dft_real);
        Xm1_dft_real = -fftshift(Xm2_dft_imag);
        Xm1_dft_imag =  fftshift(Xm2_dft_real);
    else
        Xm0_dft_real = mask.*fftshift(Xm1_dft_real);
        Xm1_dft_real = mask.*fftshift(Xm2_dft_real);
    end;
end;
figure(1)
subplot(211)
plot(n,x,n,xr(n+1));
title('Direct MDCT reconstruction');
subplot(212)
plot(n,x,n,xr_dft(L+n+1));
if do_dft_synth
    title('Reconstruction based on DFT');
else
    title('Reconstruction based on TDAC');
end;
```

What is claimed is:

1. A system for efficiently converting a signal from a first transform-domain representation to a second transform-domain representation comprising:

first means for obtaining an input signal expressed via said first transform-domain signal representation and second means for expressing said input signal via a second transform-domain signal representation without intermediate time-domain conversion, in response to the receipt of said input signal.

2. The system of claim 1 wherein said first transform-domain signal representation represents a Modified Discrete Cosine Transform (MDCT) signal, and said second transform-domain signal representation represents a Discrete Fourier Transform (DFT) signal.

3. The system of claim 2 wherein said second means further includes third means for combining effects of an Inverse Modified Discrete Cosine Transform (IMDCT), a synthesis window function, and an analysis window function and providing a first signal in response thereto.

4. The system of claim 3 wherein said second means further includes fourth means for converting said MDCT signal to a DFT signal based on said first signal.

5. The system of claim 4 wherein said synthesis window function is an MDCT synthesis window function associated with said MDCT signal, and wherein said analysis window function is a DFT analysis window function associated with a DFT domain.

6. The system of claim 5 wherein said fourth means includes a means for performing a fast transform on said MDCT signal and providing a first transformed signal in response thereto.

7. The system of claim 6 wherein said first transformed signal is characterized by the following equation:

$$g_i[r] = e^{-j\frac{\pi r}{n}} F_N\{X_N[i,k]e^{(j\phi_k(-1)^k}(-j)\}$$

where $g_i[r]$ represents said first transformed signal; k and r are integer index variables; $j=\sqrt{-1}$; $F_N\{\ \}$ is an N-point DFT function; $X_N[i,k]$ represents an N-point MDCT associated with an $i^{th}$ frame of said MDCT signal; N is the length of the N-point MDCT; and $\phi_k$ is a phase term defined by $$\phi_k = \frac{2\pi n_0}{N}(k+1),$$

where $$n_0 = \frac{N}{4} + \frac{1}{2}.$$

8. The system of claim 6 wherein said means for performing a fast transform includes means for computing said first transformed signal via a quarter point complex inverse DFT.

9. The system of claim 8 wherein said first transformed signal is computed in accordance with the following expressions via said means for computing said first transformed signal:

$$\dot{A}_i\left[r+\frac{N}{4}\right]+j\dot{A}_i[r] = \frac{N}{2}e^{j\frac{\pi}{N}(2r-n_0)}F_{\frac{N}{4}}^{-1}\left\{(-1)^{k+1}e^{-j\frac{2\pi k}{N}}\left(X_N[i,k]+jX_N\left[i,\frac{N}{2}-2k-1\right]\right)\right\}$$

where $$0 \leq k \leq \frac{N}{4}-1 \text{ and } 0 \leq r \leq \frac{N}{4}-1,$$

and $$\dot{B}_i[r] = \begin{cases} -\dot{A}_i\left[\frac{N}{4}-r\right] & 0 \leq r \leq \frac{N}{4} \\ \dot{A}_i\left[\frac{3N}{4}-r\right] & \frac{N}{4}+1 \leq r \leq \frac{N}{2}-1 \end{cases},$$

where $$\dot{A}_i\left[\frac{N}{4}-r\right], \ 0 \leq r \leq \frac{N}{4}$$

are the even samples of the first transformed signal for the first half of the $i^{th}$ frame;

$$\dot{A}_i\left[\frac{3N}{4}-r\right], \ \frac{N}{4}+1 \leq r \leq \frac{N}{2}-1$$

are the even samples of the first transformed signal for the second half of the $i^{th}$ frame; $\dot{B}_i[r]$ represents the odd samples of the first transformed signal; and where $$F_{\frac{N}{4}}^{-1}\{\ \}$$

is a quarter-point complex inverse DFT function.

10. The system of claim 7 wherein said fourth means further includes means for selectively delaying and updating said first transformed signal to yield second and third transformed signals, respectively, in response thereto.

11. The system of claim 10 wherein said second transformed signal is characterized by the following equation:

$$\bar{g}_i[r] = g_i\left[r-\frac{N}{2}\right]\text{sgn}\left(r-\frac{N}{2}\right),$$

where $\bar{g}_i[r]$ represents said second transformed signal, and $$g_i\left[r-\frac{N}{2}\right]$$

represents said first transformed signal delayed by a circular delay of $$\frac{N}{2}.$$

12. The system of claim 11 wherein said third transformed signal is characterized by the following equation:

$$\bar{\bar{g}}_i[r] = \bar{g}_i\left[r-\frac{N}{2}\right]\text{sgn}\left(r-\frac{N}{2}\right),$$

where $\bar{\bar{g}}_i[r]$ represents said third transformed signal, and $$\bar{g}_i\left[r-\frac{N}{2}\right]$$

represents said second transformed signal delayed by a circular delay of $$\frac{N}{2}.$$

13. The system of claim 10 wherein said fourth means further includes means for operating on said first, second, and third transformed signals via third, second, and first combined window functions, respectively, and providing third, second, and first windowed signals, respectively, in response thereto.

14. The system of claim 13 wherein said first combined window function ($\sigma_0[r]$) is defined in accordance with the following equation:

$$\sigma_0[r] = w[-r]f\left[-r+\frac{N}{2}\right] - w[N-r]f\left[\frac{3N}{2}-r\right],$$

where $0 \leq r \leq N-1$ and $w[r]$ and $f[r]$ are zero outside this interval; $w[r]$ represents said analysis window function; $f[r]$ represents said synthesis window function; and $r$ and $N$ are as defined above.

15. The system of claim 14 wherein said second combined window function ($\sigma_1[r]$) is defined in accordance with the following equation:

$$\sigma_1[r] = w[-r]f[-r] - w[N-r]f[N-r].$$

16. The system of claim 15 wherein said third combined window function ($\sigma_2[r]$) is defined in accordance with the following equation:

$$\sigma_0[r] = w[-r]f\left[-r-\frac{N}{2}\right] - w[N-r]f\left[\frac{N}{2}-r\right].$$

17. The system of claim 13 wherein said fourth means includes an adder for adding said first, second, and third windowed functions and providing an added digital signal in response thereto.

18. The system of claim 17 wherein said fourth means further includes means for performing an Inverse Discrete Fourier Transform (IDFT) on said added digital signal and providing said DFT signal as output in response thereto.

19. A system for facilitating compression-domain modification of a digital signal comprising:
   first means for converting a compression-domain signal to a modification-domain signal without intermediate time-domain conversion and
   second means for modifying signal components of said modification-domain signal and providing a modified modification-domain signal in response thereto.

20. The system of claim 19 wherein said compression-domain signal is a Modified Discrete Cosine Transform (MDCT) signal; said modification-domain signal is a Discrete Fourier Transform (DFT) signal; and said modified modification-domain signal is a modified DFT signal.

21. The system of claim 20 further including third means for converting said modified DFT signal to a desired domain and providing an output signal in response thereto.

22. The system of claim 21 wherein said desired domain is the MDCT domain.

23. The system of claim 21 wherein said desired domain is the time domain.

24. An efficient digital system for facilitating coding and signal component modification comprising:

first means for converting a time-domain digital input signal to a first frequency domain that accommodates coding and providing a first transform-domain digital signal in response thereto;

second means for coding said first transform-domain digital signal and providing an encoded signal in response thereto;

third means for decoding said encoded signal and providing a decoded signal in response thereto;

fourth means for transforming said decoded signal from a first transform domain directly to a second transform domain for accommodating signal component modification and providing a second transform-domain digital signal in response thereto;

sixth means for modifying components of said second transform-domain digital signal and providing a modified signal in response thereto; and seventh means for converting said modified signal to a digital output time-domain signal.

25. The system of claim 24 wherein said first means further includes an analog-to-digital converter for converting an analog input signal into said time-domain digital input signal.

26. The system of claim 25 wherein said seventh means further includes means for converting said digital output time-domain signal to an analog output signal.

27. The system of claim 25 wherein said second means for coding includes an encoder for performing signal compression via psychoacoustics, quantization, and/or entropy coding.

28. The system of claim 27 further including eighth means for transferring said encoded signal through an intermediate medium before implementation of said third means.

29. The system of claim 28 wherein said intermediate medium is a channel.

30. The system of claim 29 wherein said intermediate medium is a memory.

31. The system of claim 24 wherein said first transform domain is the Modified Discrete Cosine Transform (MDCT) domain.

32. The system of claim 31 wherein said second transform domain is the Discrete Fourier Transform (DFT) domain.

33. The system of claim 32 wherein said fourth means includes an MDCT-to-DFT conversion circuit for implementing the following conversion function:

$$\chi_N[i+1,l]=F_N^{-1}\{\sigma_0[r]\bar{\bar{g}}_i[r]+\sigma_1[r]\bar{g}_{i+1}[r]+\sigma_2[r]g_{i+2}[r]\}$$

where $\chi_N[i+1,l]$ is the N-point DFT for frame i+1 of said decoded signal; i is an integer frame index; l is an integer variable representing the frequency index of $\chi_N[i,l]$; N is a predetermined integer corresponding to the length of said N-point DFT; $F_N^{-1}$ is an N-point inverse DFT function that operates on $\sigma_0[r]\bar{\bar{g}}_i[r]+\sigma_1[r]\bar{g}_{i+1}[r]+\sigma_2[r]g_{i+2}[r]$; r is an integer variable representing an index into the sequence to be processed by the inverse DFT; $\sigma_0[r]$, $\sigma_1[r]$, and $\sigma_2[r]$ are a first, second and third combined window functions, respectively, that represents the combined effects of a predetermined MDCT synthesis window function and a DFT analysis window function associated with a first frame, a second frame, and a third frame, respectively; $g_{i+2}[r]$ is a function of a DFT of an MDCT associated with an i+2 frame of said decoded signal; $\bar{g}_{i+1}[r]$ is a delayed version of a $g_{i+1}[r]$ function associated with an i+1 frame of said decoded signal; $\bar{\bar{g}}_i[r]$ is a delayed version of $\bar{g}_i[r]$, which is a delayed version of a $g_i[r]$ function associated with an $i^{th}$ frame of said decoded signal.

34. A system for efficiently transforming a digital signal from the Modified Discrete Cosine Transform (MDCT) domain to the Discrete Fourier Transform (DFT) domain comprising:

a fast transform circuit in communication with an input MDCT digital signal in an MDCT domain;

a first delay and update circuit having an input connected to an output of said fast transform circuit;

a second delay and update circuit having an input connected to an output of said first delay and update circuit;

a first combined window multiplier incorporating a first MDCT synthesis window function and a first DFT analysis window function and having an input connected to an output of said second delay and update circuit;

a second combined window multiplier incorporating a second MDCT synthesis window function and a second DFT analysis window function and having an input connected to an output of said first delay and update circuit;

a third combined window multiplier incorporating a third MDCT synthesis window function and a third DFT analysis window function and having an input connected to an output of said fast transform circuit;

an adder having inputs connected to outputs of said first combined window multiplier, said second combined window multiplier, and said third combined window multiplier; and an Inverse Discrete Fourier Transform (IDFT) circuit having an input connected to an output of said adder, an output of said IDFT circuit representing a DFT signal associated with said input MDCT digital signal.

35. An efficient method for facilitating coding and signal component modification of a digital signal comprising the steps of:

converting a time-domain digital input signal to a first frequency domain that accommodates coding and providing a first transform-domain digital signal in response thereto;

coding said first transform-domain digital signal and providing an encoded signal in response thereto;

transferring said encoded signal through an intermediate medium;

decoding said encoded signal and providing a decoded signal in response thereto;

transforming said decoded signal from a first transform domain directly to a second transform domain that accommodates signal component modification and providing a second transform-domain digital signal in response thereto;

modifying components of said second transform-domain digital signal and providing a modified signal in response thereto; and converting said modified signal to a digital output time-domain signal.

36. The method of claim 35 wherein said first transform domain is a compression domain.

37. The method of claim 36 wherein said second transform domain is a modification domain.

38. A method for efficiently converting a signal from a first transform domain to a second transform domain comprising the steps of:

determining steps required to convert a first signal from said first transform domain to a time domain and then to a second transform domain and selectively combining said steps to eliminate intermediate time-domain conversion.

39. A method for converting a signal from a first transform domain to a second transform domain comprising the steps of:

determining an expression for a segment of an intermediate time-domain signal based on a first transform-domain signal expression, said expression incorporating a second transform-domain analysis window and a first transform-domain synthesis window;

applying a second transform associated with said second transform domain to said expression to yield a second transform-domain expression;

computing a first transform-domain function and a second transform-domain function from said second transform-domain expression;

expressing a second transform-domain signal in terms that may include a convolution of the first transform-domain function with the second transform-domain function and/or corresponding conjugate functions;

performing an inverse second transform of the product between the second transform of the first transform-domain function and the second transform of the second transform-domain function and/or the product between corresponding conjugate functions to yield a second transform-domain representation; and employing a fast algorithm based on said second transform-domain representation and symmetry thereof to compute a second transform-domain signal corresponding to said first transform-domain signal.

40. The method of claim 39 further including the step of employing said first transform-domain signal as computed for a first frame to determine transform-domain signals for subsequent frames.

* * * * *

UNITED STATES PATENT AND TRADEMARK OFFICE
CERTIFICATE OF CORRECTION

PATENT NO. : 6,963,842 B2
APPLICATION NO. : 09/948053
DATED : November 8, 2005
INVENTOR(S) : Michael Goodwin It is certified that error appears in the above-identified patent and that said Letters Patent is hereby corrected as shown below:

In column 3, line 48, delete " $\{X_N[i,k]e^{j\varphi_k(-1)^k}(-j)\},$ " and insert -- $\{X_N[i,k]e^{j\varphi_k(-1)^k}(-j)\},$ --, therefor.

In column 9, line 7, delete "and $X_N[i+2,2k]$" before "where".

In column 13, line 26, after "signal $\check{x}(t)$" insert -- . --.

In column 14, line 32, delete " $\{\sigma_0[r]\overline{g}_i[r]$ " and insert -- $\{\sigma_0[r]\overline{\overline{g}}_i[r]$ --, therefor.

In column 16, line 22, delete " $\overline{g}_i[r]$ " and insert -- $\overline{\overline{g}}_i[r]$ --, therefor.

In column 17, line 16, delete " $\sigma_0[r]\overline{g}_i[r]$ " and insert -- $\sigma_0[r]\overline{\overline{g}}_i[r]$ --, therefor.

In column 19, line 30, delete "$g_1[r]$" and insert -- $g_i[r]$ --, therefor.

In column 21, line 55, after "N-1" delete "," and insert -- ; --, therefor.

In column 22, line 19, delete "," and insert -- ; -- before "$T_1=0$", therefor.

In column 24, line 14, delete " $Q_{i,a}[l]F_N^{-1}$ " and insert -- $Q_{i,a}[l] = F_N^{-1}$ --, therefor.

In column 27, line 59, delete " $e^{-j\pi\frac{n}{N}}\}\},$ " and insert -- $e^{-j\frac{\pi n}{N}}\}\},$ --, therefor.

In column 28, line 14, delete " $e^{-j\frac{2\pi n}{2N}}$ " and insert -- $e^{-j\frac{2\pi n}{N}\left(k+\frac{1}{2}\right)}$ --, therefor.

In column 28, line 22, delete " $X_N[k] = \text{Re}\{e^{-j\frac{2\pi n_0}{2N}}$ " and insert -- $X_N[k] = \text{Re}\{e^{-j\frac{2\pi n_0}{N}}$ --, therefor.

UNITED STATES PATENT AND TRADEMARK OFFICE
CERTIFICATE OF CORRECTION

PATENT NO. : 6,963,842 B2
APPLICATION NO. : 09/948053
DATED : November 8, 2005
INVENTOR(S) : Michael Goodwin It is certified that error appears in the above-identified patent and that said Letters Patent is hereby corrected as shown below:

In column 28, line 24, after " $\chi'_N[k]\}$ " insert -- , --.

In column 31, line 19, delete "wf_0_mod_real" and insert -- wf0_mod_real --, therefor.

In column 31, line 20, delete "wf_0_mod_imag" and insert -- wf0_mod_imag --, therefor.

In column 31, line 21, delete "wf_2_mod_real" and insert -- wf2_mod_real --, therefor.

In column 31, line 22, delete "wf_2_mod_imag" and insert -- wf2_mod_imag --, therefor.

In column 31, line 23, delete "wf_1_mod_real" and insert -- wf1_mod_real --, therefor.

In column 31, line 24, delete "wf_1_mod_imag" and insert -- wf1_mod_imag --, therefor.

In column 34, line 45, in Claim 7, delete " $e^{(j\phi_k(-1))^k}$ " and insert

-- $e^{j\phi_k(-1)^k}$ --, therefor.

UNITED STATES PATENT AND TRADEMARK OFFICE
CERTIFICATE OF CORRECTION

PATENT NO. : 6,963,842 B2
APPLICATION NO. : 09/948053
DATED : November 8, 2005
INVENTOR(S) : Michael Goodwin It is certified that error appears in the above-identified patent and that said Letters Patent is hereby corrected as shown below:

In column 37, line 60, in Claim 33, delete " $\{\sigma_0[r]\overline{g}_i[r]$ " and insert -- $\{\sigma_0[r]\overline{\overline{g}}_i[r]$ --, therefor.

Signed and Sealed this

Tenth Day of March, 2009

JOHN DOLL
*Acting Director of the United States Patent and Trademark Office*